(12) United States Patent
Jessen et al.

(10) Patent No.: US 11,254,031 B2
(45) Date of Patent: Feb. 22, 2022

(54) ADDITIVE MANUFACTURING DEVICE AND SYSTEM FOR MANUFACTURING A SACRIFICIAL MOULD FOR CREATING AN OBJECT

(71) Applicant: Addifab ApS, Taastrup (DK)

(72) Inventors: Jon Jessen, Veksø (DK); Lasse Guldborg Staal, Jyllinge (DK)

(73) Assignee: Addifab ApS, Taastrup (DK)

( * ) Notice: Subject to any disclaimer, the term of this patent is extended or adjusted under 35 U.S.C. 154(b) by 353 days.

(21) Appl. No.: 16/084,644

(22) PCT Filed: Mar. 13, 2017

(86) PCT No.: PCT/EP2017/055841
§ 371 (c)(1),
(2) Date: Sep. 13, 2018

(87) PCT Pub. No.: WO2017/157851
PCT Pub. Date: Sep. 21, 2017

(65) Prior Publication Data
US 2019/0077054 A1 Mar. 14, 2019

(30) Foreign Application Priority Data
Mar. 14, 2016 (DK) .............................. PA201670149

(51) Int. Cl.
*B29C 33/38* (2006.01)
*B29C 33/52* (2006.01)
(Continued)

(52) U.S. Cl.
CPC .......... *B29C 33/3842* (2013.01); *B29C 33/00* (2013.01); *B29C 33/52* (2013.01);
(Continued)

(58) Field of Classification Search
None
See application file for complete search history.

(56) References Cited

U.S. PATENT DOCUMENTS

| 5,782,286 A | 7/1998 | Sommerich |
| 6,609,043 B1 | 8/2003 | Zoia |

(Continued)

FOREIGN PATENT DOCUMENTS

| GB | 2515773 A | 1/2015 |
| WO | WO 2000/051761 A1 | 9/2000 |

(Continued)

OTHER PUBLICATIONS

Search Report in Danish Patent Application No. PA 201670149, dated Nov. 23, 2016 (4 pages).
(Continued)

*Primary Examiner* — Matthew J Daniels
*Assistant Examiner* — Paul Spiel
(74) *Attorney, Agent, or Firm* — Nixon Peabody LLP

(57) ABSTRACT

An additive manufacturing device for manufacturing a mould. The additive manufacturing device includes a container for providing at least one mould material, a build platform having a build surface for holding and/or supporting at least one mould being or having been manufactured by an additive manufacturing process, a source for providing energy to selectively activate and subsequently solidify the at least one mould material in or from the container to enable additive manufacturing of the mould, and an electronic controller adapted to selectively control the source to manufacture the mould as a one-piece sacrificial mould according to a predetermined design producing a one-piece additively manufactured mould.

17 Claims, 17 Drawing Sheets

(51) Int. Cl.
  *B33Y 80/00*     (2015.01)
  *B33Y 10/00*     (2015.01)
  *B33Y 30/00*     (2015.01)
  *B29C 33/00*     (2006.01)
  *B29C 64/10*     (2017.01)
  *B29C 64/40*     (2017.01)
  *B29C 64/245*    (2017.01)
  *B29C 64/165*    (2017.01)
  *H04R 25/00*     (2006.01)

(52) U.S. Cl.
  CPC ............ *B29C 64/10* (2017.08); *B29C 64/165* (2017.08); *B29C 64/245* (2017.08); *B29C 64/40* (2017.08); *B33Y 10/00* (2014.12); *B33Y 30/00* (2014.12); *B33Y 80/00* (2014.12); *H04R 25/658* (2013.01)

(56) References Cited

U.S. PATENT DOCUMENTS

| | | | |
|---|---|---|---|
| 2005/0006047 A1 | 1/2005 | Wang | |
| 2005/0240303 A1* | 10/2005 | Smith | B29C 45/80 700/200 |
| 2006/0078638 A1* | 4/2006 | Holmboe | B33Y 30/00 425/174.4 |
| 2011/0068502 A1 | 3/2011 | Basseas | |
| 2012/0193841 A1* | 8/2012 | Wang | B22F 3/1055 264/645 |
| 2012/0274005 A1 | 11/2012 | Bailey | |
| 2015/0035200 A1 | 2/2015 | Karpas | |
| 2015/0144284 A1 | 5/2015 | Snyder | |
| 2015/0210007 A1 | 7/2015 | Durand | |
| 2015/0375419 A1 | 12/2015 | Gunther | |
| 2016/0067766 A1 | 3/2016 | Verreault | |
| 2017/0259507 A1* | 9/2017 | Hocker | B29C 64/35 |

FOREIGN PATENT DOCUMENTS

| | | |
|---|---|---|
| WO | WO 2015/112583 A1 | 7/2015 |
| WO | WO 2015/112885 A1 | 7/2015 |

OTHER PUBLICATIONS

International Search Report and Written Opinion of International Searching Authority for Application No. PCT/EP2017/055841, dated Jun. 1, 2017 (13 pages).

* cited by examiner

400

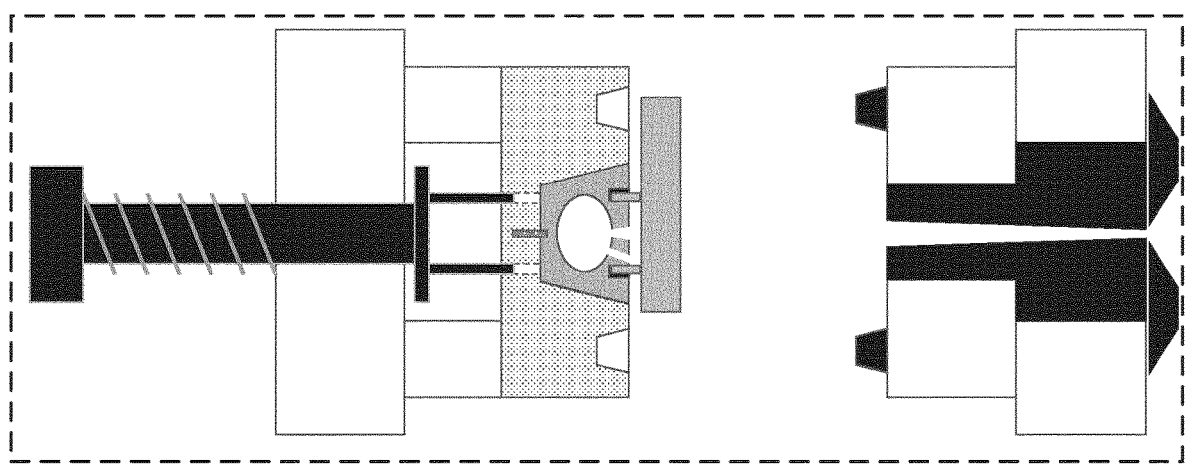
B)  500
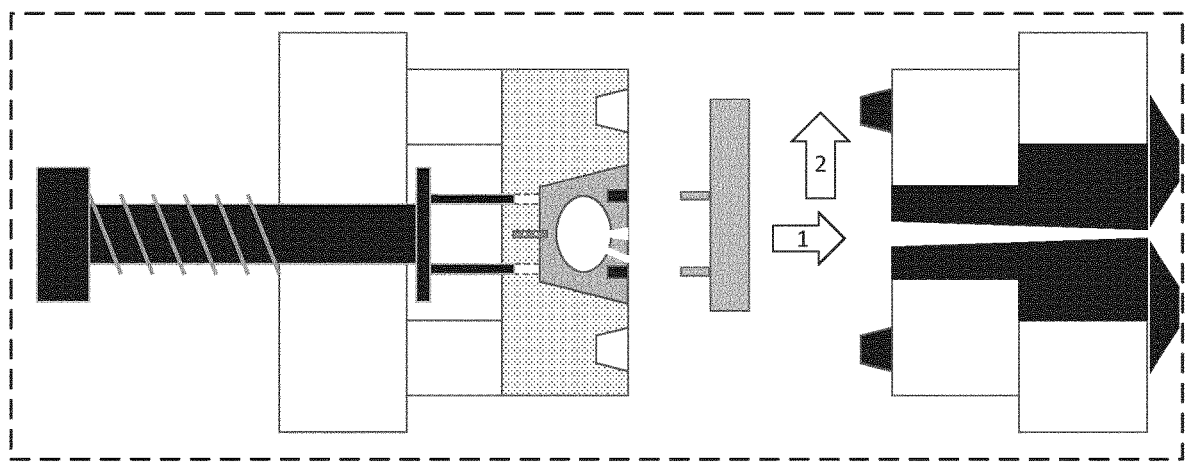
C)  500
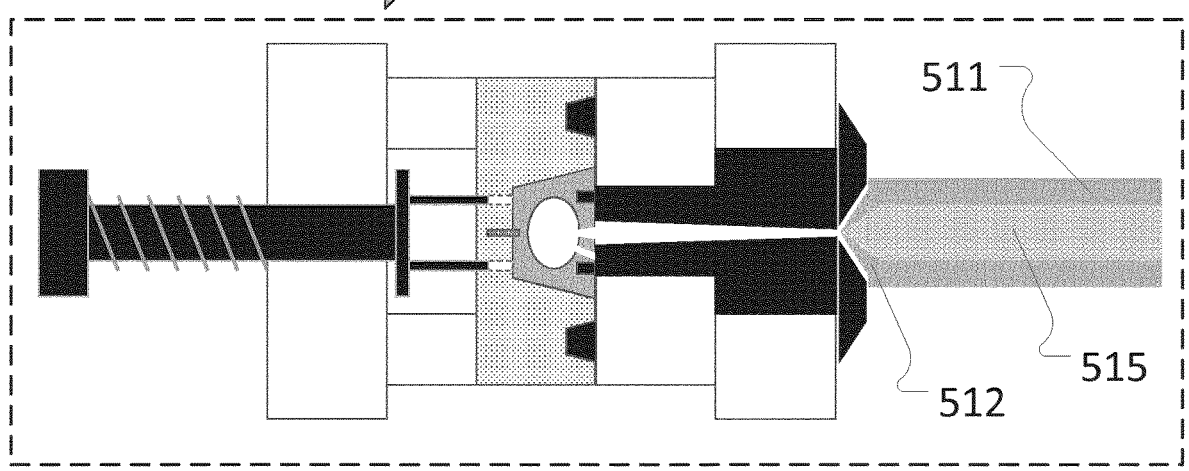
D)  FIG. 9  500

ADDITIVE MANUFACTURING DEVICE AND SYSTEM FOR MANUFACTURING A SACRIFICIAL MOULD FOR CREATING AN OBJECT

CROSS-REFERENCE TO RELATED APPLICATIONS

This application is a U.S. National Stage of International Application No. PCT/EP2017/055841, filed Mar. 13, 2017, which claims the benefit of Denmark Patent Application No. PA201670149, filed Mar. 14, 2016, both of which are incorporated herein by reference in their entireties.

FIELD OF THE INVENTION

The invention relates generally to an additive manufacturing device for manufacturing a mould, a moulding system for moulding an object, and a manufacturing system for manufacturing an object using a mould.

BACKGROUND

Additive manufacturing—also called 3D printing—has become an important tool, not only for product development but also for actual production of products or components of products but currently mostly customized products or components, or very low volume production.

Rapid prototyping, iterative design, and concept validation are three disciplines that are considerably facilitated by 3D printers. Several different 3D printing platforms are commercially available in the market today, and each of these platforms have important characteristics and advantages that a product developer may exploit to create design models, demonstrators, functional prototypes, and small batches of components for product validation.

In relation to production, 3D printing have been used to create moulds where the aim is to create a volume that may subsequently be fully or partially filled with a desired material to create a given component or product. 3D printing has e.g. been used to print ear-moulds for hearing aids or to print moulds for injection or blow moulding.

In the creation of moulds using 3D printers, mainly three paradigms exist.

One relates to creation of a sacrificial single-use mould that is filled with a suitable building material and that is then removed by suitable means once the building material has cured. The 3D printing method of choice for the creation of the mould is often stereolithography and this paradigm is frequently used for the manufacture of silicone moulds for hearing aids. A main limitation is that the post-processing (cleaning, filling, and removal of the moulds) after printing, that is required to create an object, is a manual operation for various reasons, which is time and resource consuming, and which is strongly dependent on the individual skill of the operator. Another limitation is that the selection of liquid or powderized building material is limited, which in turn limits the overall applicability of the method. A third limitation is that mechanical removal of the moulds (e.g. by cracking, breaking, etc.) is presently the only methods of removal, which prevents automation and leads to increased scrap rates.

Another paradigm relates to creation of plastic injection mould inserts that are mounted in an injection moulding machine and used for limited production runs (typically less than 50 units). For these applications, the choice of building materials is much wider and encompasses all the standard thermoplastic resins available for injection moulding. The 3D printing method of choice for mould insert creation is often material jetting or binder jetting. However, a main limitation is the comparatively weak wear resistance of the plastics, which means that fine mould details and mould precision quickly will degrade. This is especially the case for Metal Injection Moulding (MIM) applications and Ceramic Injection Moulding (CIM) applications, where the addition of abrasive metal and/or ceramic powder to the thermoplastic resin will substantially increase wear on the plastic injection mould.

For these reasons, the use of 3D printed plastic injection mould inserts is limited to objects that do not contain abrasives—such as metal or ceramic powders—and components with coarse geometries that do not require very fine tolerances and reproducibility.

A third paradigm relates to creation of metal injection moulds or metal injection mould inserts that are mounted in the injection moulding machine and used for continuous production. For these applications, the choice of building materials is wider and encompasses all the standard thermoplastic resins available for injection moulding, and also the thermoplastic binders and resins used for Metal Injection Moulding and Ceramic Injection Moulding. The additive manufacturing method of choice is often direct metal laser sintering and a main limitation is the expense and time associated with the run-in, manufacturing, and post-processing of the components before they can be used. In addition, the selection of mould insert building materials is still comparatively limited. The need for parting lines in the injection mould constrain design flexibility, and tolerance chains become longer when two-part injection moulds are used, which impacts the final precision of the component.

Patent application US 2011/0068502 discloses a method of forming custom shaped injection moulded parts from elastomeric materials using a rapid prototyping system to create a rigid hollow mould where the mould has a relatively thin breakable side wall that can be broken to extract an elastomeric part from the mould after curing. No disclosure is given on ways to fill the polymer mould using an injection moulding tool, nor on ways to automate and integrate the moulding process to increase productivity.

U.S. Pat. No. 6,609,043 discloses a method for constructing a structural foam part that comprises three steps. Step one uses a rapid prototyping process, such as stereolithography, to create a polymer mould. Step two requires filling the polymer mould with a material. The last step calls for heating the polymer mould and the material to heat set the material and to remove the polymer mould thereby forming the structural foam part. No disclosure is given on ways to fill the polymer mould using an injection moulding tool, nor on ways to automate and integrate the moulding process to increase productivity Patent application US 2015/0375419 discloses a method for producing casting moulded parts where a water-soluble casting mould is produced in a first step using a layering method and in particular using a powder bed-based layering method. In a second step, the surface of the casting mould is sealed with the aid of a material after which a casting of the moulded part is then formed by filling the casting mould with a free-flowing hardenable material, in particular a hydraulically setting material. After the casting has solidified, the casting mould is dissolved with the aid of an aqueous solution and in particular a heated aqueous solution. No disclosure is given about injection moulding moulds, nor on ways to automate and integrate the moulding process to increase productivity.

U.S. Pat. No. 5,782,286 discloses a method of casting hollow bone prosthesis with tailored flexibility, where the metal used for the casting is poured directly into a refractory (ceramic) sacrificial mould and solidifies in the mould prior to sacrificial. No disclosure is given about injection moulding moulds, nor on ways to automate and integrate the moulding process to increase productivity.

Patent specification GB 2515772 discloses a method of making a conduit and/or mould suitable for use in a casting process that uses an additive layer manufacturing process.

SUMMARY

It is an object to alleviate at least one or more of the above mentioned drawbacks at least to an extent.

An aspect of the invention is defined in claim 1.

Accordingly, in one aspect of the present invention is provided an additive manufacturing device for manufacturing a mould, wherein the additive manufacturing device comprises
- a container for providing at least one mould material (i.e. a material to form the mould from/through additive manufacturing),
- a build platform having a build surface for holding and/or supporting at least one mould being or having been manufactured by an additive manufacturing process,
- a source for providing energy to selectively activate and subsequently solidify the at least one mould material in or from the container to enable additive manufacturing of the mould, and
- an electronic controller adapted to selectively control the source to manufacture the mould as a one-piece sacrificial (i.e. single use) mould according to a predetermined design producing a one-piece sacrificial additively manufactured mould comprising
  - one or more outer shells circumscribing and enclosing at least a first inner volume,
  - at least one inlet being connected to the first inner volume and being adapted to receive at least one building material,
  - at least one outlet being connected to the first inner volume and being adapted to release air (or another gas) from the first inner volume when the first inner volume receives the at least one building material via the at least one inlet.

In this way, an additive manufacturing device is provided where a mould is produced using an additive manufacturing process that is suitable for process automation including post-processing as desired or required.

Additionally, producing moulds using additive manufacturing enables the creation of a great number of different and varied objects that may be created from many different possible materials, some of which may only be created if the mould is built as a single-piece mould.

In particular, a single-piece mould allows use of geometries that cannot readily be made by means of "classic" two-part moulding techniques. A two-part mould requires that objects be made with drafts and that mould parts comprise parting lines that allow separation of the mould parts after completion of moulding. This is not the case with single-piece moulds made by additive manufacturing that may have any geometry as limited by the additive manufacturing and subsequently filled with a building material.

A single-piece mould may more easily be stacked for storage and transport purposes than the object that it contains.

A single-piece mould that is shipped along while still containing the object, and thus forming part of the object envelope, provides protection (including potentially sterile barrier protection e.g. for medical devices/uses) of the object until the mould is removed, e.g. allowing for sterile production independent of moulding facility environment.

A sacrificial or single-use mould has several advantages.

The sacrificial use aspect has many advantageous applications and is of particular value in the manufacture of moulds e.g. for abrasive substance applications such as metal or ceramic injection moulding, but in general for liquid injection applications where thermal consolidation (e.g. sintering) is part of the post-processing (e.g. for the manufacture of metal or ceramic objects). The solvents and/or elevated temperatures used in a debinding and/or sintering will automatically result in the removal of the mould (either through dissolving, melting, decomposition, evaporation, or even integration), and mould materials may even be tailored to support sintering applications.

Single-use moulds in addition enable the possibility of added/improved feature details including added precision and reduced tolerance chain lengths since it eliminates wear and degradation of moulds normally otherwise found in additively manufactured moulds even used as little as two times.

A sacrificial mould provides an object enclosure that may e.g. lend itself to automated handling or pick-and-place operations in a way that is superior to that of the finished objects once they have been released from the mould.

A use of multiple single-piece single-use moulds manufactured using high-precision additive manufacturing with the purpose of short-run production (e.g. to support cost-efficient product validation) will more easily ensure conformity with tight tolerances across the short-run production than the use of a single two-part mould manufactured using a plastic resin.

A single-use mould may e.g. comprise traceability features that may not be available to the object they enclose (e.g. through the embedding of RFID tags, bar codes, fiducial markers, or other means of identification) thus supporting advanced traceability throughout the production.

Making a single-piece mould in a transparent material, and including a camera or other sensor in the mould would support real-time mould flow analysis and research, with an unprecedented level of accuracy and validity.

Single-piece moulds may also support the moulding of components comprising multiple building materials, e.g. through the additive manufacturing of inner walls that may separate a mould's internal cavity into two or more individual cavities. Each cavity may be configured to receive a specific building material through its own inlet and the integration of materials may be supported through the creation of gates or holes in each inner wall through which a first material may protrude or flow into the cavity that is meant to contain a second material.

In some embodiments, the one-piece sacrificial additively manufactured mould is a cast moulding mould for moulding an object using cast moulding.

In some embodiments, the one-piece sacrificial additively manufactured mould is an injection moulding mould for moulding an object using injection moulding.

In some embodiments, the at least one mould material consist of one or more predetermined dissolvable materials whereby a one-piece sacrificial additively manufactured mould manufactured from the at least one mould material becomes dissolvable when being exposed to a predetermined dissolving agent, e.g. before or during a debinding and/or sintering process if applicable.

This allows for easy removal of the mould after the given object has been created.

In some embodiments, the additive manufacturing device further comprises a transportation mechanism adapted to automatically load
- the build platform into the additive manufacturing device prior to, and in preparation of, commencement of additive manufacturing, and/or
- the one-piece sacrificial additively manufactured mould or the build platform comprising the one-piece sacrificial additively manufactured mould into and/or out of the additive manufacturing device.

This readily facilitates automated handling of the mould and/or the object created by the mould.

In some embodiments, the build platform comprises one or more securing elements enabling a transportation mechanism to releasably and mechanically connect with and move the build platform into and/or out from the additive manufacturing device.

This readily facilitates automated handling of the mould and/or the object created by the mould.

In some embodiments, the additive manufacturing device further comprises
- one or more actuators and one or more controller systems (e.g. a vision control system or a linear encoder system), and/or
- one or more mechanical orientation elements, that are configured to position the build platform and/or an element for introducing building material into the one-piece sacrificial additively manufactured mould relative to each other to permit the introduction of building material into the one-piece sacrificial additively manufactured mould.

This readily facilitates automated handling of the mould and/or the object created by the mould.

In some embodiments,
- the additive manufacturing device further comprises or is connected to at least one moulding reservoir or container comprising at least one building material, and
- the additive manufacturing device is adapted to introduce building material directly or indirectly from the at least one moulding reservoir or container into the one-piece sacrificial additively manufactured mould.

This allows for moulding an object using the mould directly by the additive manufacturing device.

According to a second aspect is provided a moulding system for moulding an object using a one-piece sacrificial additively manufactured mould manufactured by an additive manufacturing device, e.g. as disclosed above and throughout the present specification, wherein the moulding system
- comprises or is in connection with at least one moulding reservoir or container comprising at least one building material,
- is adapted to introduce building material directly or indirectly from the at least one moulding reservoir or container into the one-piece sacrificial additively manufactured mould, and
- is adapted to actively or passively solidify the introduced building material thereby producing an object as defined by the one-piece sacrificial additively manufactured mould.

This readily produces an object from one-piece sacrificial additively manufactured mould providing different advantages.

In some embodiments, the one-piece sacrificial additively manufactured mould is
- a cast moulding mould and wherein the building material comprises one or more of
  - one or more silicone or other rubbers or rubber-like material(s), and/or
  - one or more epoxies, and/or
  - one or more organic binders, and/or
  - one or more polyacetal binders, and/or
  - one or more filler materials such as ceramic powder or particles, metallic powder or particles, glass powder or particles, glass beads or glass fibres, carbon black or carbon powder or particles, nanotubes, and/or re-used or re-cycled plastic and/or resin powder.

In some embodiments, the one-piece sacrificial additively manufactured mould is
- an injection mould and the moulding system is or comprises an injection moulding device, and wherein the building material comprises one or more of
  - one or more silicone or other rubbers or rubber-like material(s), and/or
  - one or more thermoplastic elastomers, and/or
  - one or more thermosetting compounds, and/or
  - one or more polyacetal binders, and/or
  - one or more organic binders, and/or
  - one or more filler materials such as ceramic powder or particles, metallic powder or particles, glass powder or particles, glass beads, or glass fibres, carbon black or carbon powder or particles, nanotubes, and/or re-used or re-cycled plastic and/or resin powder.

In some embodiments, the moulding system comprises one or more actuators and one or more controller systems (e.g. a vision control system or a linear encoder system) and/or one or more mechanical orientation elements that are configured to position the build platform and/or an element for introducing building material into the one-piece sacrificial additively manufactured mould relative to each other to permit the introduction of building material into the one-piece sacrificial additively manufactured mould. This includes embodiments, where the moulding system is comprised by, mounted on, and/or being connected with the one or more actuators (and thereby moves with at least one of the actuators).

This readily enables automatic filling of the mould and thereby automatic casting or injection moulding of objects, due to automatic positioning of (mould) inlet(s) and (filler equipment) outlet(s).

In some embodiments, the moulding system is further adapted to add one or more filler elements to the building material when, or prior to, producing the object. Alternatively, one or more filler elements are present or introduced in the building material already.

In some embodiments, the one or more filler elements
- comprise gas-filled bubbles or spheres contributing, by their inclusion in the finished object, to the lowering of the weight of the finished object, and/or
- comprise bubbles or spheres that comprise one or more substances to be released into the building material according to one or more predetermined criteria, such as being exposed to
  - a predetermined catalyst, or
  - a predetermined energy level.

In some embodiments, the one or more filler elements
- comprises gas bubbles and/or physical spheres or other physical containers that comprise one or more substances to be released into the building material according to one or more predetermined criteria, such as being exposed to
    a predetermined catalyst, or
    a predetermined energy level.
In some embodiments,
    the gas bubbles are gas bubbles created by introducing a pressurised gas into the building material, the pressurised gas comprising the one or more substances to be released, and/or
    the physical spheres or other physical containers are pre-formed solid hollow containers comprising the one or more substances to be released.
In some embodiments, the one or more filler elements comprises one or more solid and/or powdered components, such as
    ceramic powder or particles,
    metallic powder or particles,
    glass powder or particles, glass beads, or glass fibres,
    carbon black or carbon powder or particles,
    nanotubes, and/or
    re-used or re-cycled plastic and/or resin powder.
In some embodiments, the building material is a thermoplastic material that solidifies upon cooling from a fluid state upon injection into the one-piece sacrificial mould. Other embodiments comprise or further comprise one or more curing and/or hardening agents that e.g. may be activated to promote a solidification of the objects following injection into the one-piece sacrificial mould.

In some embodiments, the one-piece sacrificial additively manufactured mould is moulded in such a way, e.g. by comprising one or more cavities in the one or more outer shells, that it enables a transportation mechanism to mechanically and releasably connect with the one-piece sacrificial additively manufactured mould and move it.

According to a third aspect is provided a post-processing moulding system, wherein the post-processing moulding system is adapted to
    receive a one-piece sacrificial additively manufactured mould, e.g. manufactured by an additive manufacturing device as described above and elsewhere throughout the present specification, comprising a moulded object, e.g. moulded by a moulding system as described above and elsewhere throughout the present specification, and/or
    promote or control a post-curing of the moulded object, e.g. to ensure an adequate solidification of the object prior to release.

In some embodiments, the post-processing moulding system is adapted to receive specifically a one-piece sacrificial additively manufactured mould as manufactured by an additive manufacturing device as described above and elsewhere throughout the present specification comprising a moulded object. In some further embodiments, the moulded object is moulded by a moulding system as described above and elsewhere throughout the present specification.

In some embodiments, the post-processing moulding system further comprises a release element adapted to release the moulded object from the one-piece sacrificial additively manufactured mould.

In some embodiments, the release element comprises one or more mechanical elements adapted to promote or enable the physical release of the moulded object from the one-piece sacrificial additively manufactured mould.

In some embodiments, the one-piece sacrificial additively manufactured mould consist of dissolvable material and the release element is adapted to
    apply a dissolving agent to the one-piece sacrificial additively manufactured mould to enable the release of the moulded object from the one-piece sacrificial additively manufactured mould. In a particular set of embodiments, dissolving happens prior to a debinding and/or sintering process (if applicable), e.g. where the moulded object is a 'green body' (e.g. for manufacture of a metal or ceramic object).

In some embodiments, the release element is adapted to
    apply a temperature within a predetermined range or above a predetermined temperature threshold to the one-piece sacrificial additively manufactured mould to promote the release of the moulded object from the one-piece sacrificial additively manufactured mould, and/or
    apply a temperature within a predetermined range or below a predetermined temperature threshold to the one-piece sacrificial additively manufactured mould thereby enabling the release of the moulded object from the one-piece sacrificial additively manufactured mould. In a particular set of embodiments, release happens prior to a debinding and/or sintering process, e.g. where the moulded object is a green body.

In some embodiments, the release element is adapted to
    apply a first debinding temperature regime to effect a debinding of the moulded object, e.g. after post-curing and/or mould removal if such post-curing and/or mould removal is required,
    apply a second sintering temperature regime to effect a sintering of the moulded object (400, 400') while at the same time promoting decomposition and/or integration of the mould (201) from and/or into the moulded object (201) through the use of debinding and/or sintering temperatures that are above the decomposition threshold of the mould.

The post-processing moulding system (or a manufacturing system as described below comprising a post-processing moulding system) may e.g. comprise one or more of the following elements:
    a. A measurement element that allows mechanical measurement and/or visual and/or laser and/or CT and/or ultrasonic inspection of the compliance of the moulds with the required dimensional and/or other requirements used in defining the moulds and/or the finished objects.
    b. A cleaning element that allows the automated cleaning of the one or more moulds after they have been removed from the additive manufacturing device and preferably before they are filled with building material, e.g. by immersing these in one or more cleaning agents that may e.g. comprise isopropyl alcohol, 2-(2-butoxyethoxy)ethanol or similar. The cleaning element may optionally be used to clean the finished objects once they have been removed from the moulds, and/or potentially as a release element if dissolvable mould material is used.
    c. A coating element, that allows application of one or more coating agents to the moulds and/or the objects in or outside the moulds either before or after filling. Such coatings may for instance be diluted versions of the building material(s) used for the additive manufacture of the moulds, coatings comprising colouring agents, coatings containing glazing elements, coatings containing metallurgically active elements, coatings containing conductive elements and/or coatings providing other desirable characteristics.

d. A drying element that allows for drying of the moulds and/or the objects in the moulds after cleaning and/or coating and/or before filling of the moulds with building material, and/or the drying of the objects after the moulds have been removed e. A curing and/or post-curing element that supports UV-curing, thermal curing, or similar curing of the moulds before filling of the moulds with building material and/or the building material(s) in the moulds and/or the objects either before or after the moulds have been removed.

f. A smoothing element, that allows e.g. for thermal or mechanical smoothing of the surface of the one or more moulds prior to filling and/or of the objects after the moulds have been removed g. A mechanical mould removal element that may for instance comprise a mould removal mechanism similar to that of an automated 'nut cracker'.

h. A chemical mould removal element that may for instance comprise a vat holding water or a similar compound.

i. A thermal mould removal element that may for instance comprise a heater, a freezer, a liquid nitrogen source, a carbon dioxide/dry-ice source or a similar source of elevated or lowered temperature that support the melting or embrittlement of the mould to render it more susceptible to external influence.

j. A debinding element that allows for melting, decomposition, and/or evaporation of the moulds and/or binder materials that form part of the objects in the moulds as part of forming a finished object.

k. A sintering element that allows the sintering of the moulds and/or objects as part of forming a finished object.

l. A quality assurance element that allows an automated quality assurance process to take place between processes and/or after end of the final process m. A stacking element that supports the optimal packaging of moulds and/or finished objects in transport boxes or similar.

n. A packaging element that supports the automated packaging of moulds and/or finished objects.

As described, the individual post-processing element or elements may either precede the filling of the mould or they may happen simultaneously with the filling. Finally, they may be used after the filling.

Some of the post-processing elements may function discreetly, whereas other elements may be combined to form combined post-processing elements. A first example is the combination of a cleaning element and a coating element into a first combined post-processing element. A second example is the combination of mould removal and object debinding and/or sintering into a second combined post-processing element. Other post-processing elements as readily known to a person skilled in the art may also be used.

According to a fourth aspect is provided a manufacturing system for manufacturing an object using a mould, the manufacturing system comprising
 an additive manufacturing device as described above and elsewhere throughout the present specification, and/or
 a moulding system as described above and elsewhere throughout the present specification, and/or
 a post-processing moulding system as described above and elsewhere throughout the present specification.

In some embodiments, the manufacturing system comprises a coating system or coating mechanism adapted to apply one or more coating substances to a one-piece sacrificial additively manufactured mould prior to the one-piece sacrificial additively manufactured mould being used for manufacturing an object, or alternatively to the object after the object has been released from the one-piece sacrificial additively manufactured mould.

According to a fifth aspect is provided a method of manufacturing a mould using an additive manufacturing device, wherein the method comprises
 controlling energy to of source to selectively activate, and if required subsequently solidify, the at least one mould material to additively manufacture the mould on a build platform as a one-piece sacrificial additively manufactured mould according to a predetermined design, and
wherein the manufactured one-piece sacrificial additively manufactured mould comprises
 one or more outer shells circumscribing and enclosing at least a first inner volume,
 at least one inlet being connected to the first inner volume and being adapted to receive at least one building material,
 at least one outlet being connected to the first inner volume and being adapted to release air from the first inner volume when the first inner volume receives the at least one building material via the at least one inlet.

In some embodiments, the method further comprises moulding an object using the one-piece sacrificial additively manufactured mould and at least one building material by introducing the building material directly or indirectly from at least one moulding reservoir or container into the one-piece sacrificial additively manufactured mould thereby producing an object as defined by the one-piece sacrificial additively manufactured mould.

In some embodiments, the method further comprises receiving a one-piece sacrificial additively manufactured mould comprising a moulded object and post-processing the one-piece sacrificial additively manufactured mould and/or the object.

In some embodiments, the post-processing comprises releasing the moulded object from the one-piece sacrificial additively manufactured mould.

In some embodiments, the post-processing comprises applying one or more coating substances to a one-piece sacrificial additively manufactured mould prior to the one-piece sacrificial additively manufactured mould being used for manufacturing an object, or to the object after the object has been released from the one-piece sacrificial additively manufactured mould.

In some embodiments, the post-processing comprises debinding and/or sintering at least one object while the object is either enclosed in a one-piece sacrificial additively manufactured mould or after removal of the object from the one-piece sacrificial additively manufactured mould. It is to be understood that more than one object, such as two or more, may be sintered in their respective mould or after removal from it.

In some embodiments, the method comprises
 automatically moving a build platform into an additive manufacturing system by one or more transport mechanisms,
 subsequently producing at least one one-piece sacrificial additively manufactured mould on the build platform with the additive manufacturing system, subsequently moving the build platform and the at least one one-piece sacrificial additively manufactured mould to a moulding system, subsequently producing at least one object at the moulding system using the at least one one-piece sacrificial additively manufactured mould.

In some further embodiments, the build platform is moved into the additive manufacturing system by means or mechanisms, i.e. the step of automatically moving a build platform into an additive manufacturing system by one or more transport mechanisms is optional.

In some embodiments, the moulding system is an injection moulding system and wherein one one-piece sacrificial additively manufactured mould has been manufactured with a shape where at least a part of it matingly fits in the injection moulding system at a moulding location. In this way, automation is greatly facilitated since the mould me be inserted directly into the moulding system.

In some embodiments, the at least one produced object is automatically moved by a transportation mechanism, e.g. together with the at least one-piece sacrificial additively manufactured mould, to a post-processing system.

The method may comprise one or more steps and/or functions fully or in part as described as being carried out by the various elements, systems, devices, mechanisms, etc. throughout the present specification.

According to a sixth aspect of the present invention is provided an additive manufacturing device for manufacturing a mould, wherein the additive manufacturing device comprises a container for providing at least one mould material (i.e. a material to form the mould from/through additive manufacturing), a build platform having a build surface for holding and/or supporting at least one mould being or having been manufactured by an additive manufacturing process, a source for providing energy to selectively activate and subsequently solidify the at least one mould material in or from the container to enable additive manufacturing of the mould, and an electronic controller adapted to selectively control the source to manufacture the mould as a one-piece sacrificial mould according to a predetermined design producing a one-piece sacrificial additively manufactured mould comprising one or more outer shells circumscribing and enclosing at least a first inner volume, at least one inlet being connected to the first inner volume and being adapted to receive at least one building material, at least one outlet being connected to the first inner volume and being adapted to release air (or another gas) from the first inner volume when the first inner volume receives the at least one building material via the at least one inlet, wherein the one-piece sacrificial additively manufactured mould is a cast moulding mould for moulding an object using cast moulding.

According to a seventh aspect of the present invention is provided an additive manufacturing device for manufacturing a mould, wherein the additive manufacturing device comprises a container for providing at least one mould material (i.e. a material to form the mould from/through additive manufacturing), a build platform having a build surface for holding and/or supporting at least one mould being or having been manufactured by an additive manufacturing process, a source for providing energy to selectively activate and subsequently solidify the at least one mould material in or from the container to enable additive manufacturing of the mould, and an electronic controller adapted to selectively control the source to manufacture the mould as a one-piece sacrificial mould according to a predetermined design producing a one-piece sacrificial additively manufactured mould comprising one or more outer shells circumscribing and enclosing at least a first inner volume, at least one inlet being connected to the first inner volume and being adapted to receive at least one building material, at least one outlet being connected to the first inner volume and being adapted to release air (or another gas) from the first inner volume when the first inner volume receives the at least one building material via the at least one inlet, wherein the one-piece sacrificial additively manufactured mould is an injection moulding mould for moulding an object using injection moulding such as metal injection moulding, ceramic injection moulding, thermoplastic injection moulding, thermoset injection moulding, or liquid injection moulding.

Embodiments as detailed in connection with the first aspect may also be embodiments for the sixth and/or seventh aspect where applicable. Furthermore, the second to fifth aspect may also be combined with the sixth and/or the seventh aspect.

In particular, in some embodiments of the sixth and/or seventh aspect (also), a one-piece sacrificial additively manufactured mould is manufactured in such a way (e.g. as shown as examples with 802 in FIGS. 8-10) that it enables a transportation mechanism to mechanically (and potentially but not necessarily releasably) connect with the one-piece additively manufactured mould and move it. Such a transportation mechanism may be part of the disclosed additive manufacturing device for manufacturing a mould or be external thereto.

Additionally, in some embodiments and as disclosed herein, a produced one-piece sacrificial additively manufactured mould is automatically loaded into a suitable moulding system, e.g. an injection moulding system.

In all aspects, a respective electronic controller is adapted to selectively control the source to manufacture the mould using a definition file or the like as generally known in the art.

Throughout the present description, a one-piece sacrificial additively manufactured mould may also be referred to as one-piece additively manufactured mould or simply a mould.

A one-piece sacrificial additively manufactured mould according to at least some embodiments of the aspects of the present disclosure corresponds more or less in function to prior art inserts (being two piece inserts or even three or more piece inserts) but with additional advantages as disclosed herein.

Definitions

All headings and sub-headings are used herein for convenience only and should not be constructed as limiting the invention in any way.

The use of any and all examples, or exemplary language provided herein, is intended merely to better illuminate the invention and does not pose a limitation on the scope of the invention unless otherwise claimed. No language in the specification should be construed as indicating any non-claimed element as essential to the practice of the invention.

Throughout the entire specification and in the accompanying claims, 'one-piece additively manufactured mould' and simply 'mould' is to be taken as being the same thing unless expressively mentioned otherwise.

Throughout the entire specification and in the accompanying claims, the term 'mould material' is to be understood as the material used to produce a mould (using additive manufacturing). Mould material may also comprise several materials.

Throughout the entire specification and in the accompanying claims, 'building material' is to be understood as the material used to generate an object by being filled or introduced into a mould. The building material may also comprise several materials.

This invention includes all modifications and equivalents of the subject matter recited in the claims appended hereto as permitted by applicable law.

DETAILED DESCRIPTION

Various aspects and embodiments of an additive manufacturing device and system as disclosed herein will now be described with reference to the figures.

When/if relative expressions such as "upper" and "lower", "right" and "left", "horizontal" and "vertical", "clockwise" and "counter clockwise" or similar are used in the following terms, these refer to the appended figures and not necessarily to an actual situation of use. The shown figures are schematic representations for which reason the configuration of the different structures as well as their relative dimensions are intended to serve illustrative purposes only.

Some of the different components are only disclosed in relation to a single embodiment of the invention, but are meant to be included in the other embodiments without further explanation.

Figure 1:
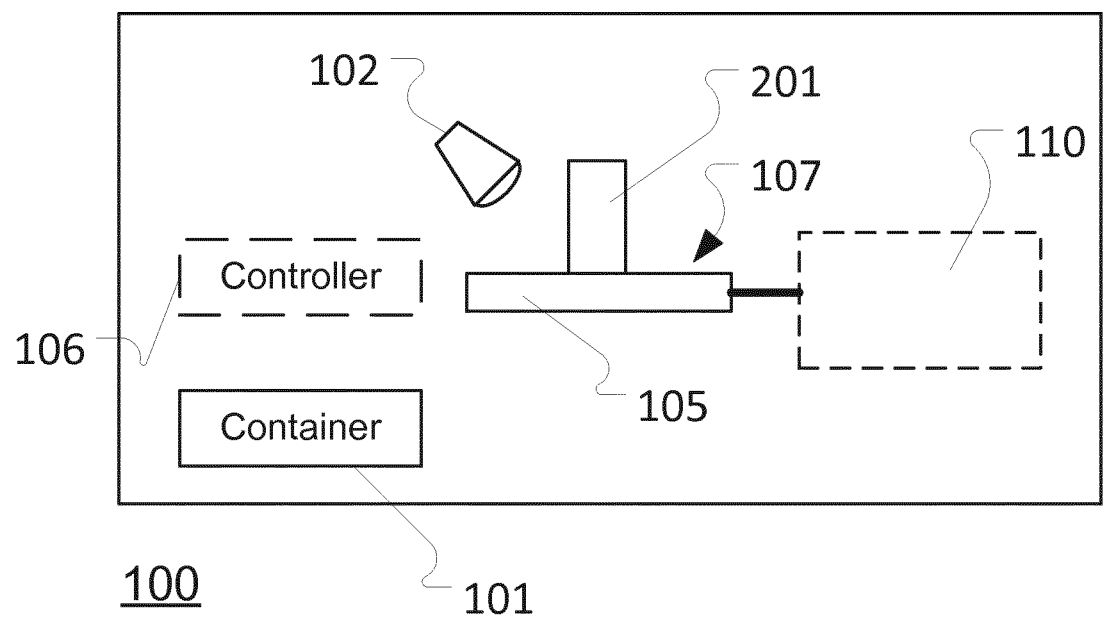
FIG. 1 schematically illustrates a block diagram of an additive manufacturing device according to some embodiments.

FIG. 1 schematically illustrates a block diagram of an additive manufacturing device according to some embodiments.

Illustrated is an additive manufacturing device 100 for manufacturing at least one mould 201 as will be described in the following.

The additive manufacturing device 100 comprises a container 101 or the like and a build platform 105 having a build surface 107 for holding and/or supporting at least one mould 201 being or having been manufactured by an additive manufacturing process. The container 101 contains at least one mould material (i.e. the material used to make a mould), e.g. a radiation-curable liquid, powdered material, etc., to be used in manufacturing of the mould 201. The container 101 may e.g. be a vat or similar.

Figure 7:
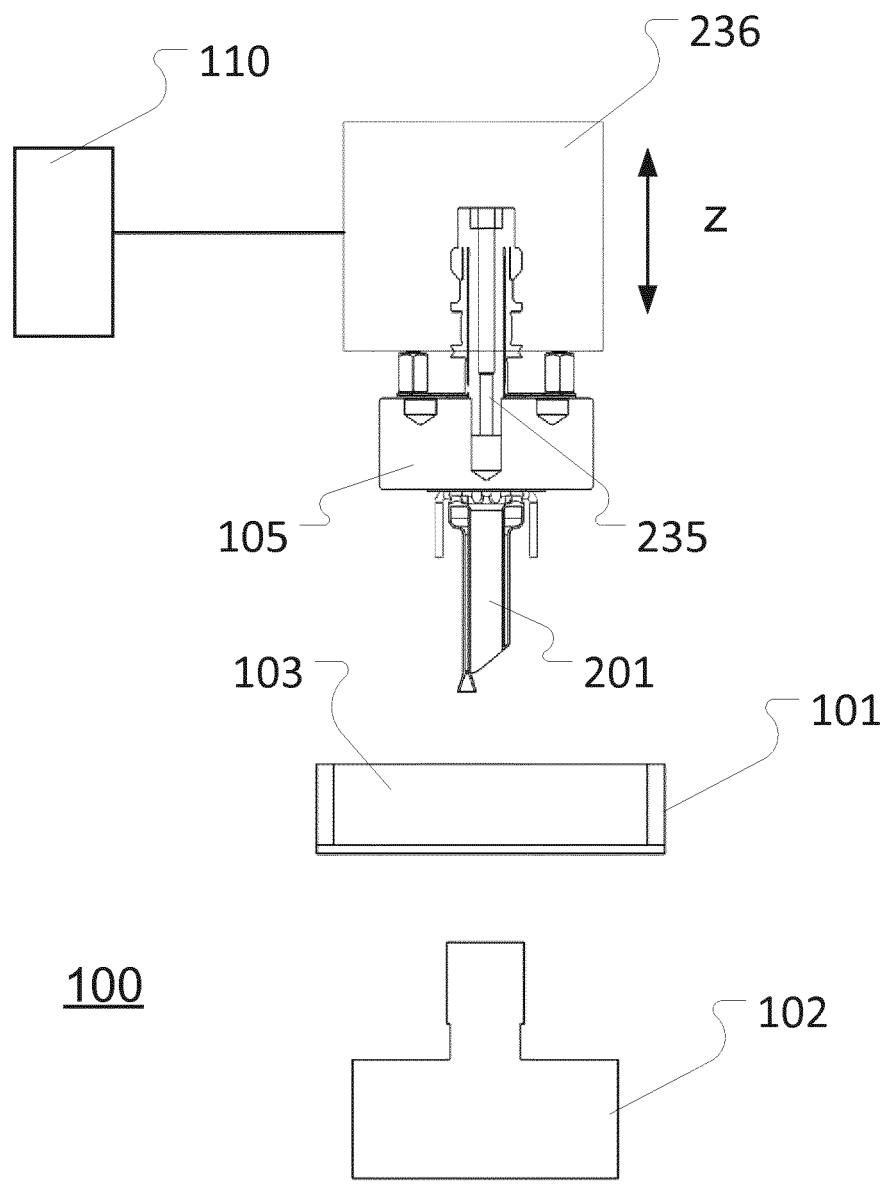
FIG. 7 schematically illustrates an embodiment of an additive manufacturing device as illustrated in FIG. 1 with further details.

The build platform 105 may e.g. be movable relative to the container 101 in at least one predetermined direction, e.g. as shown in FIG. 7.

The additive manufacturing device 100 also comprises at least one source 102 for providing energy to selectively activate the at least one mould material and, if required, then subsequently solidify the at least one mould material in or from the container 101 to enable additive manufacturing of the mould.

The source 102 may e.g. be an energy- and/or light source. Alternatively or complementarily, it may comprise an energized material source, e.g. a material jetting source, a binder jetting source, an extruded material source, or another source that is capable of selectively activating the at least one mould material and—if required—subsequently solidify the at least one mould material.

The additive manufacturing device 100 may furthermore comprise an electronic controller 106 and/or be connected to an external electronic controller.

The electronic controller 106 may be connected to the additive manufacturing device 100 via a suitable data interface or it may (as shown as an example) alternatively be built into the additive manufacturing device.

The electronic controller 106 is adapted to selectively control the source 102 to manufacture the mould 201 as a one-piece mould according to a predetermined design thereby producing a one-piece additively manufactured mould 201.

Depending on what specific type of additive manufacturing process is used for manufacturing the mould, i.e. what specific type the additive manufacturing device 100 is, the electronic controller 106 may be adapted to selectively control at least an energy level and/or focus point of the energy of the source 102. For material jetting or other material deposition manufacturing processes, the electronic controller 106 is adapted to control the parameters relevant for jetting or other deposition of material.

In some embodiments, the electronic controller 106 controls motion of the build platform 105, motion of the energy source 102, or a combination thereof to manufacture the mould 201.

Figure 11:
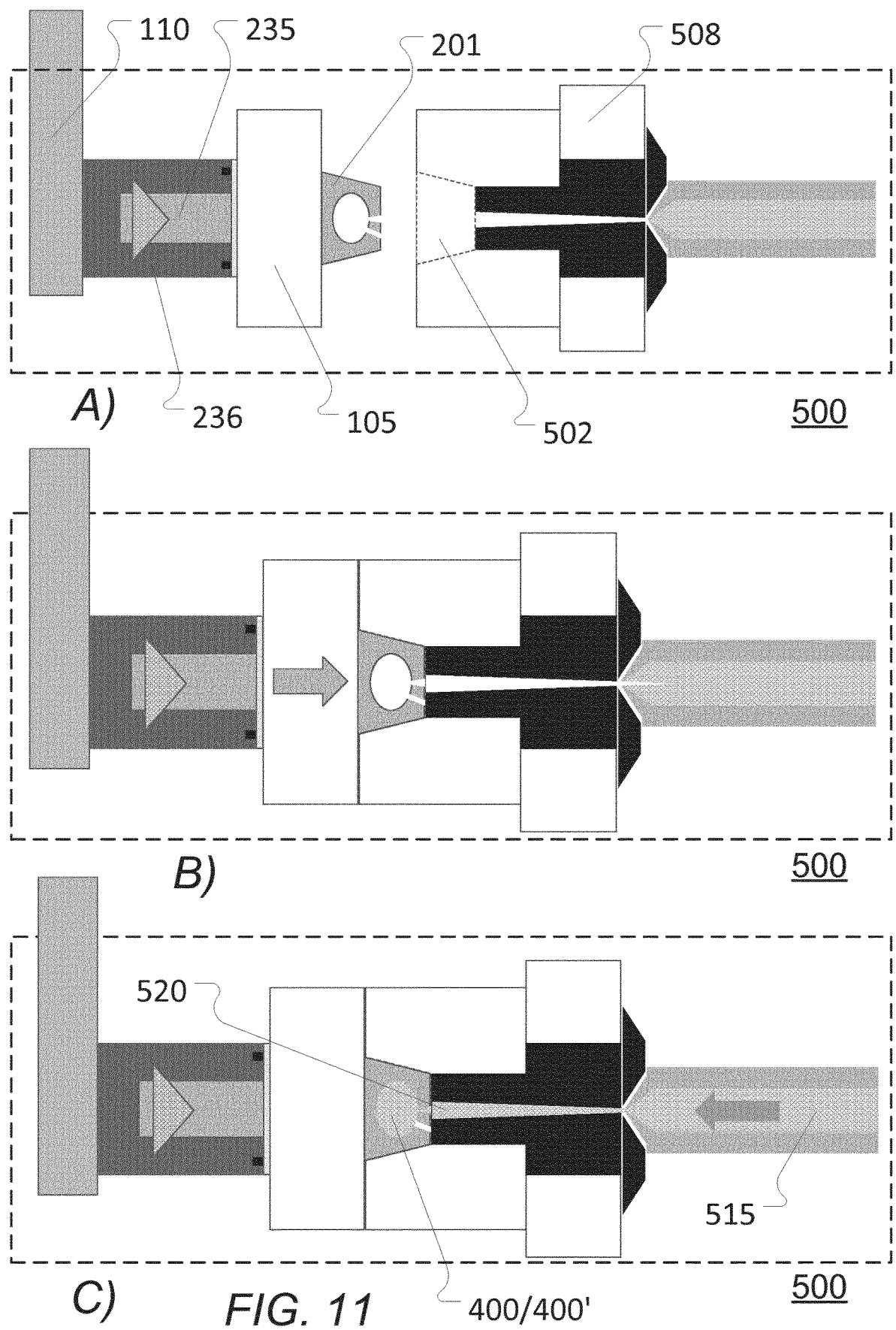
FIGS. 11a-11d schematically illustrate a one-piece additively manufactured mould being handled by an alternative transportation mechanism in the moulding system of FIGS. 9a-9h.

According to an aspect of the present invention, a one-piece additively manufactured mould 201 is produced that comprises a mould body or one or more outer shells circumscribing and enclosing at least a first inner volume (see 205 and 210, respectively, e.g. in FIG. 2), at least one inlet (see 230 e.g. in FIG. 2) being connected to the first inner volume and being adapted to receive at least one building material (as will be explained further e.g. in connection with FIGS. 9 and 11), and at least one outlet (see 220 e.g. in FIG. 2) being connected to the first inner volume and being adapted to release air or another gas/gas mixture from the first inner volume when the first inner volume receives the at least one building material via the at least one inlet. The building material may e.g. be liquid but may also be a powderized material.

An outlet may be any form outlet or interface that allows the exit of fluid, in particular gas. It does not necessarily have to be a full opening and might e.g. be one or more porous sections, thin slits, etc.

Preferably, the one-piece additively manufactured mould 201 is a sacrificial mould. This avoids wear and degradation normally otherwise found and enables added feature details.

In some embodiments, the one-piece additively manufactured mould 201 is a cast moulding mould, e.g. as shown and explained as an example in connection with FIGS. 2-5.

In some alternative embodiments, the one-piece additively manufactured mould 201 is an injection moulding mould, e.g. as explained as an example in connection with FIGS. 8-11.

In some embodiments, the additive manufacturing device 100 further comprises a transportation mechanism 110 being adapted to automatically move a one-piece additively manufactured mould 201 and/or the build platform 105 comprising the one-piece additively manufactured mould 201 into and/or out and away from the additive manufacturing device 100 e.g. to a further stage in an automated process. The transportation mechanism 110 may also—alternatively or as an addition—be adapted to automatically load the build platform 105 into the additive manufacturing device 100 prior to—and in preparation of—commencement of additive manufacturing.

This automatic loading and/or unloading of build platforms and one-piece additively manufactured moulds enables a highly automated object manufacturing process based on the use of one or more moulds, as will be explained further in connection with FIG. 12 and elsewhere.

The transportation mechanism 110 may alternatively be external to the additive manufacturing device 100 but providing the same functionality.

In some embodiments, the build platform 105 comprises one or more securing elements (not shown; see e.g. 235 in FIGS. 3 and 7) enabling a transportation mechanism 110 to releasably and mechanically connect with the build platform 105 and move it.

The one-piece additively manufactured mould 201 may e.g. be secured to the build platform 105 in various different ways, e.g. by being glued to it during a stereolithographic process, melted securely to it (e.g. during a fused deposition modelling process), laser-welded to it (e.g. during a laser sintering process), or in other ways that are inherently due to the additive manufacturing process being used, etc.

In some embodiments, the one-piece additively manufactured mould 201 is manufactured in such a way (e.g. as shown as examples with 802 in FIGS. 8-10) that it enables a transportation mechanism 110 to mechanically (and potentially but not necessarily releasably) connect with the one-piece additively manufactured mould 201 and move it.

The transportation mechanism 110 may e.g. be or comprise a robotic arm, a robotic machine, gripping unit, or any other suitable conveyer mechanisms or devices.

The additive manufacturing device 100 may be any of any suitable type.

In some embodiments, the additive manufacturing device 100 is a top-projection based 3D printer configured to manufacture a given one-piece additively manufactured mould 201.

In such embodiments, the additive manufacturing device 100 may e.g. comprise a container in the form of a vat 101 or similar comprising a radiation-curable liquid as a mould material, and where the source 102 may then be a radiation source for selectively exposing and solidifying the radiation-curable liquid in the vat. Further, the build platform 105 will be movable relative to the vat in at least one predetermined direction.

The electronic controller 106 may control the relative position of the movable build platform 105 relative to the liquid and it may control the radiation source to produce the radiation pattern e.g. as dictated by a product definition file or the like, a template or mask, etc. and a suitable lens system may e.g. be used to focus the radiation on the liquid surface.

To form a new layer, the movable build platform 105 will be lowered some distance into the liquid thereby being ready for exposure of the new layer. This is repeated until the mould(s) 201 have been manufactured completely as desired.

In some alternative embodiments, the additive manufacturing device 100 is a bottom-projection based 3D printer configured to manufacture a given one-piece additively manufactured mould 201, e.g. as shown and explained further in connection with FIG. 7.

During additive manufacture using a bottom-projection based 3D printer, a layer of the mould or moulds 102 may be formed by selectively exposing the radiation-curable liquid that is caught between the bottom of the vat 101 and the build platform 105 according to a desired pattern. To form a new layer, the movable build platform 105 will be raised some distance away from the bottom of the vat 101 while adherence of previously formed layers to the bottom of the vat 101 is released by a suitable mechanism. Once the build platform 105 has been raised a suitable distance and new liquid has flown into the area under the platform, the build platform 105 may be repositioned a suitable distance above the bottom of the vat 101, thereby being ready for exposure of the new layer. This is repeated until the mould(s) 201 have been manufactured completely as desired.

In other alternative embodiments, the additive manufacturing device may e.g. be another type of a stereolithographic system (such as material jetting or binder jetting, optical fabrication, photo-solidification, solid free-form fabrication, solid imaging, rapid prototyping, resin printing, and other 3D printing systems), a (selective) laser sintering system, a protrusion system, an extrusion-based 3D printer system, a 3D bio-printing or bio-plotting system, a fused deposition modelling (FDM) system, a droplet/'ink' jet-based system, a powder bed fusion system, a directed energy deposition system, and/or any other suitable additive manufacturing device/system.

When the additive manufacturing system e.g. is a (selective) laser sintering system (S)LS, the source will be a laser and the container 101 will comprise one or more powdered materials, typically powdered metals or plastics, that are sintered to be bound together thereby forming a solid structure.

The one-piece additively manufactured mould 201 may e.g. be formed of any one or more suitable mould materials—e.g. depending on what specific additively manufacturing device and/or process is/are used to produce it. Relevant materials may include photo-curable resins (e.g. liquid acrylic resins, epoxy resins or other photo-curable resins that may either be used in stereolithographic or jetting printing applications), extrudable resins (e.g. PLA, ABS, PET, PC, PEEK), or powderized resins (e.g. PA, ABS, PP).

For single-use moulds used for casting applications, expedient characteristics are that they can withstand curing temperatures and that the material should be—or be made to be—brittle/easily breakable, dissolvable, and/or otherwise easy to remove from the finished object. For a specific subset of sintering applications, the ability of the mould material to melt, decompose, and evaporate during a debinding and/or sintering process is important.

For single-use moulds used for injection moulding application, expedient characteristics are dimensional stability under elevated temperatures and highest possible wear resistance. For a specific subset of sintering applications, the ability of the mould material to dissolve before or during a debinding and/or sintering process (if applicable) is important. If the mould is not removed before or during it may cause certain issues with a green body such as micro-cracks, warpage, voids, etc. For another specific subset of sintering applications, the ability of the mould material to melt, decompose, and/or evaporate during a debinding and/or sintering process is important.

In some embodiments, the at least one mould material consists of one or more predetermined dissolvable materials that is/are dissolvable when being exposed to a predetermined dissolving agent (that does not dissolve a moulded object produced by the mould 201).

In this way, the one-piece additively manufactured mould 201 becomes dissolvable, which provides an expedient way of removing a moulded object from the mould 201 after use, and/or before debinding and/or sintering, e.g. as will be explained further in connection with FIG. 12.

As examples of such a suitable dissolvable materials are e.g. water soluble materials, such as certain rinse-out-resin materials, whereby (hot or cold) water may be used to remove a moulded object from the mould 201.

As other examples are e.g. suitable materials that may be dissolved by exposing the mould 201 to one or more certain predetermined chemical agents, e.g. an organic solvent, an acid, or a base.

There are also other ways to remove a moulded object from the mould 201, such as exposing the mould to a mechanical force that exceeds a separating or breaking strength of the mould 201, e.g. by pulling, tearing, clamping, cracking, or striking, without breaking the object in the mould; exposing the mould 201 to a temperature that promotes an increased brittleness (e.g. by subjecting the mould to liquid nitrogen, dry-ice (carbon dioxide), or a similar ultra-cool agent, perhaps in combination with a subsequent exposure to mechanical force, or such as exposing the mould 201 to a temperature that promotes a melting, decomposition and/or evaporation of said mould, e.g. by placing the mould in an oven, etc. The oven may e.g. be a sintering kiln or the like where removal of the mould 201 could be part of a sintering process.

In a specific alternative embodiment of the sintering process, the mould is made of the same material as the building material. For this embodiment, the mould is printed and cured prior to filling, and forms part of the finished object following sintering.

Figure 12:
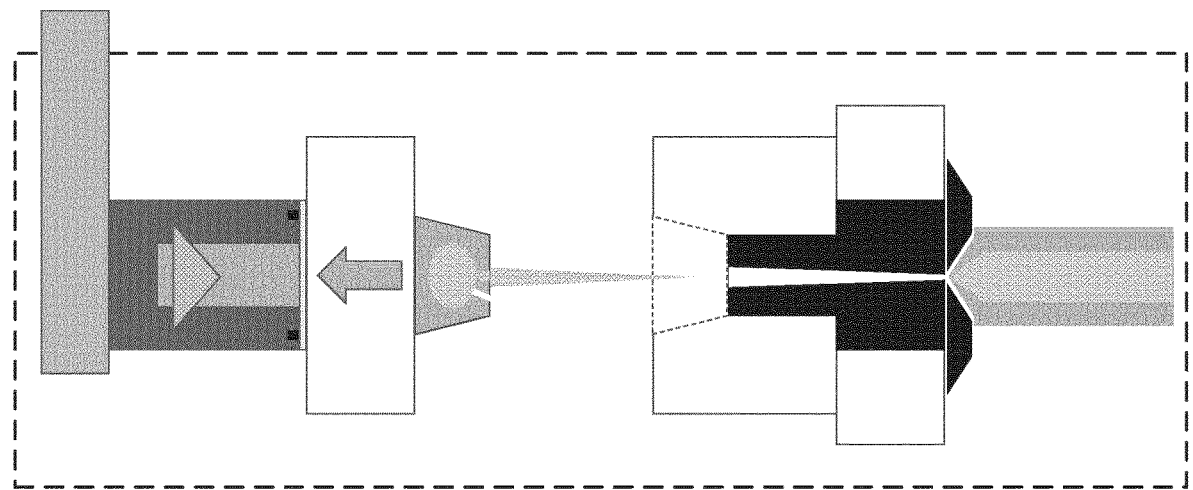
FIG. 12 schematically illustrates a manufacturing system that may employ the various embodiments of one or more additive manufacturing devices, moulding systems, and of one or more post-processing moulding system elements.
Figure 12:
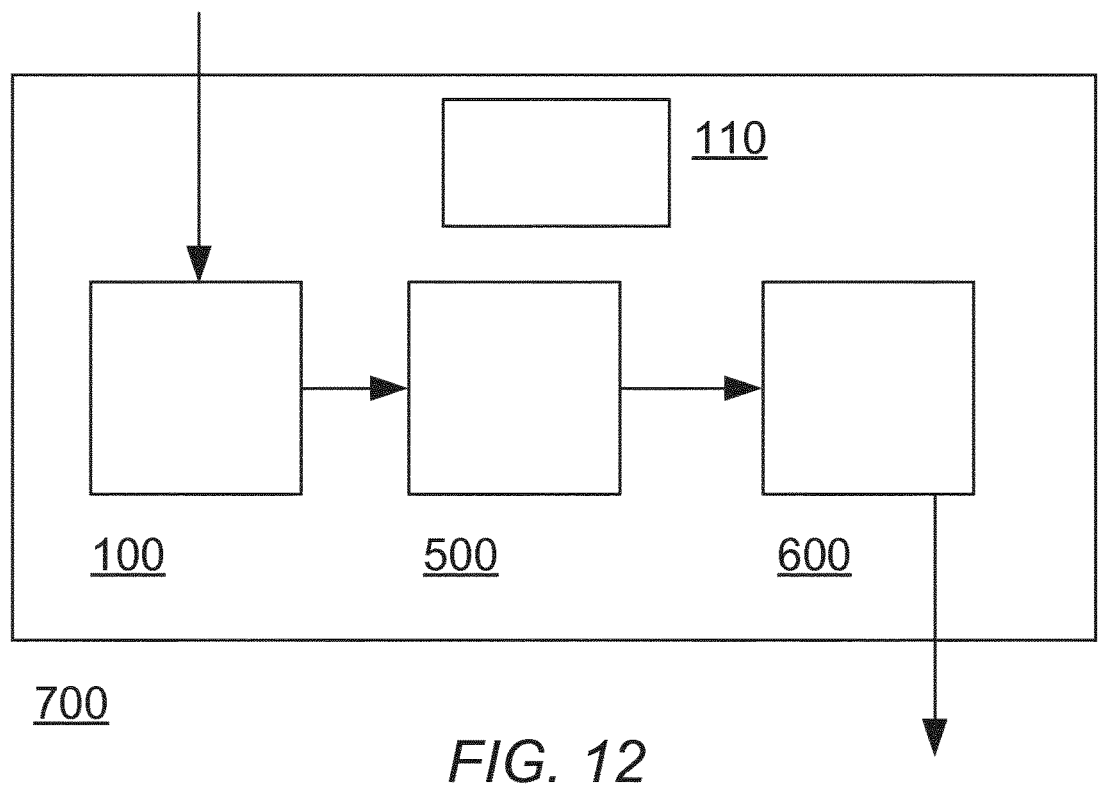

Removal of a moulded object from a mould 201 is explained further as a post-processing stage in connection with FIG. 12.

Figure 14:
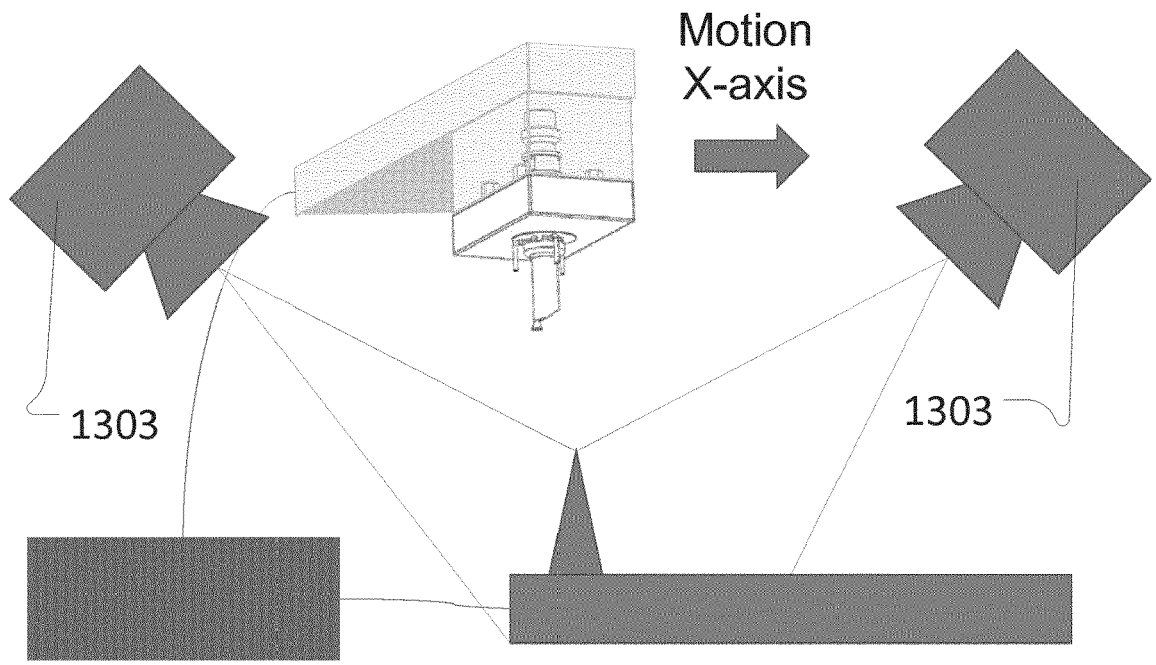
FIGS. 14a-14c schematically illustrate a vision or image based system for positioning a build platform and an element for introducing building material into a one-piece additively manufactured mould relative to each other.
Figure 14:
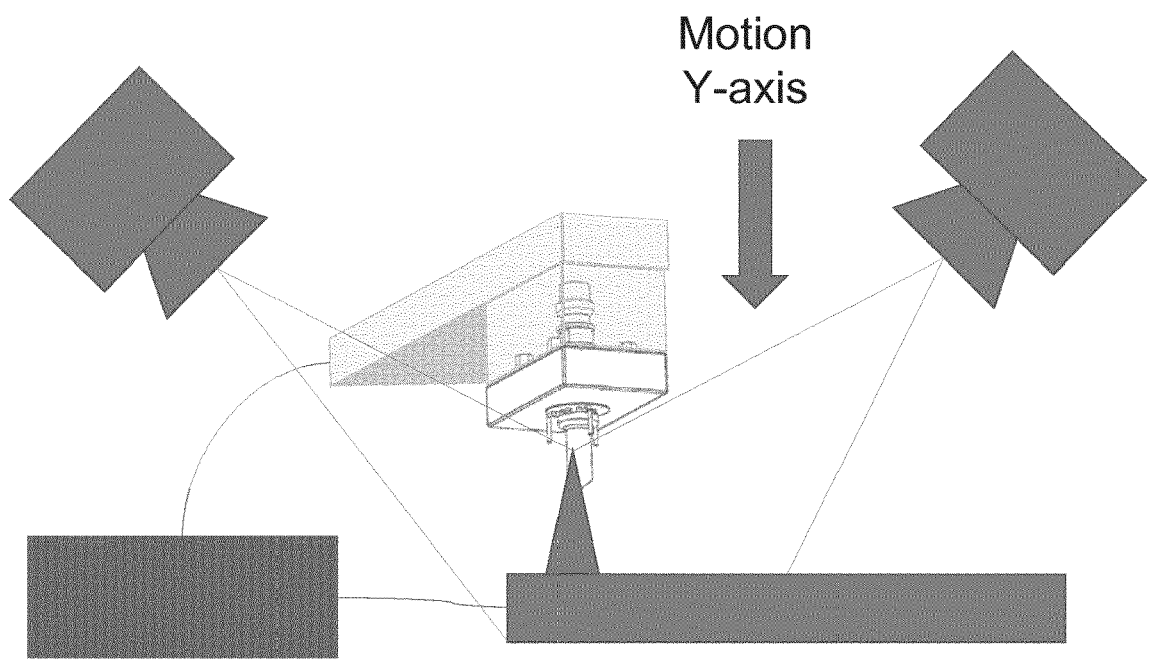
Figure 14:
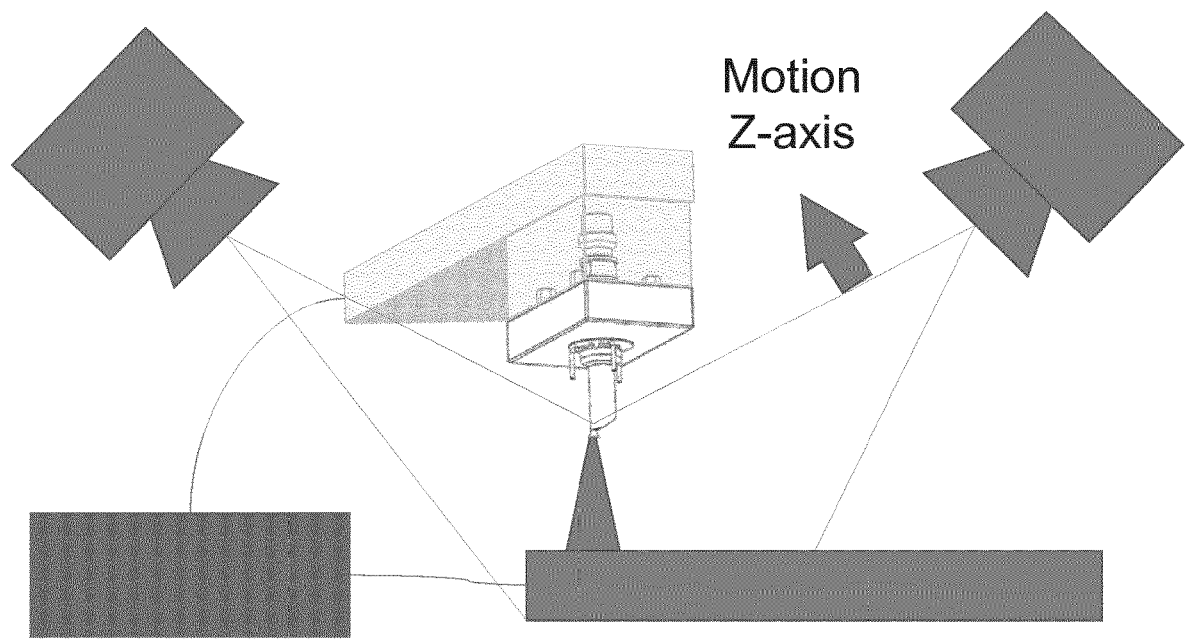

In some embodiments, the additive manufacturing device 100 or a device that transfers the mould(s) out of the additive manufacturing device 100 following manufacture, and/or a device that is configured to fill the moulds following manufacture further comprises one or more of the following elements:

1. A vision positioning system (see e.g. also FIG. 14) that supports precise navigation of a mould relative to one or more filling outlets in preparation of filling the mould with building material. Navigation may comprise moving the mould(s), the filling outlets or both these elements by suitable mechanics (e.g. linear actuators, belt drives, robot arms, etc.) to support establishment of an operative connection between at least a first filling outlet and the corresponding filling inlet of at least a first mould.

Figure 13:
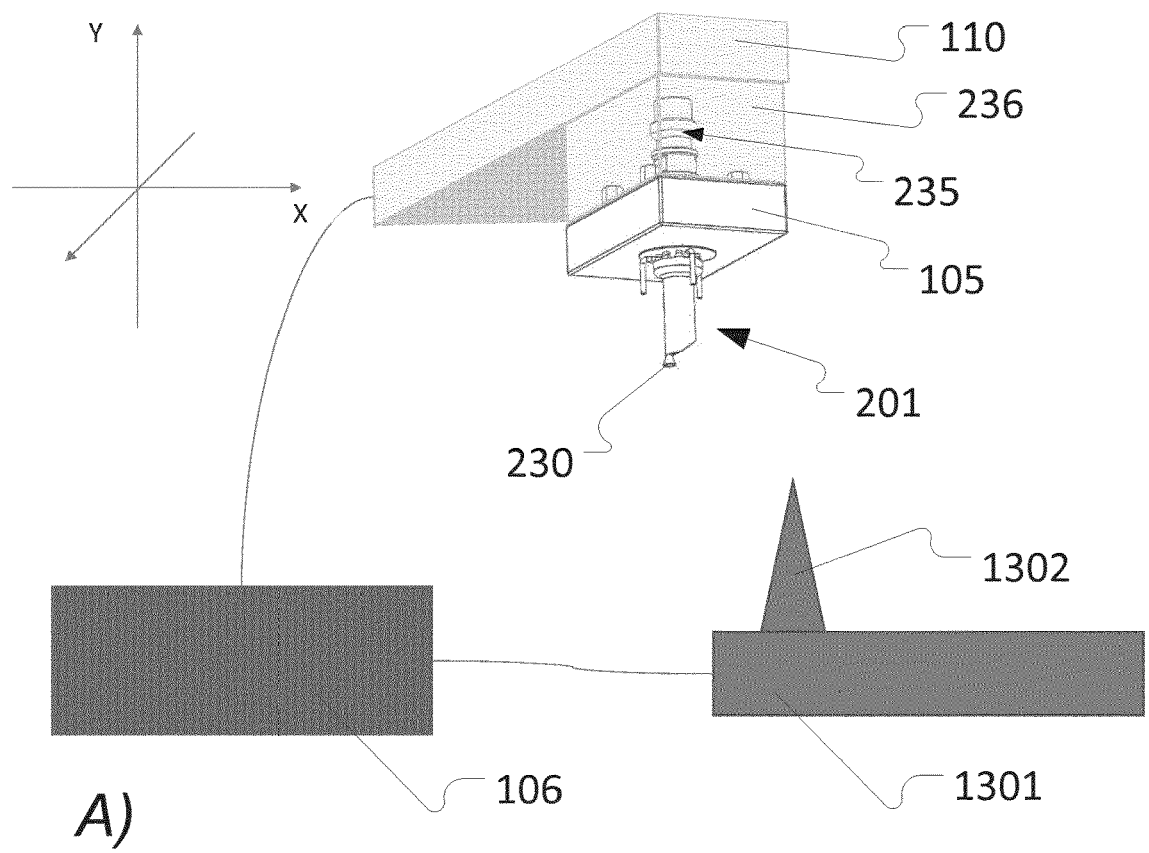
FIGS. 13a-13d schematically illustrate a X, Y, Z movement system for positioning a build platform and an element for introducing building material into a one-piece additively manufactured mould relative to each other.
Figure 13:
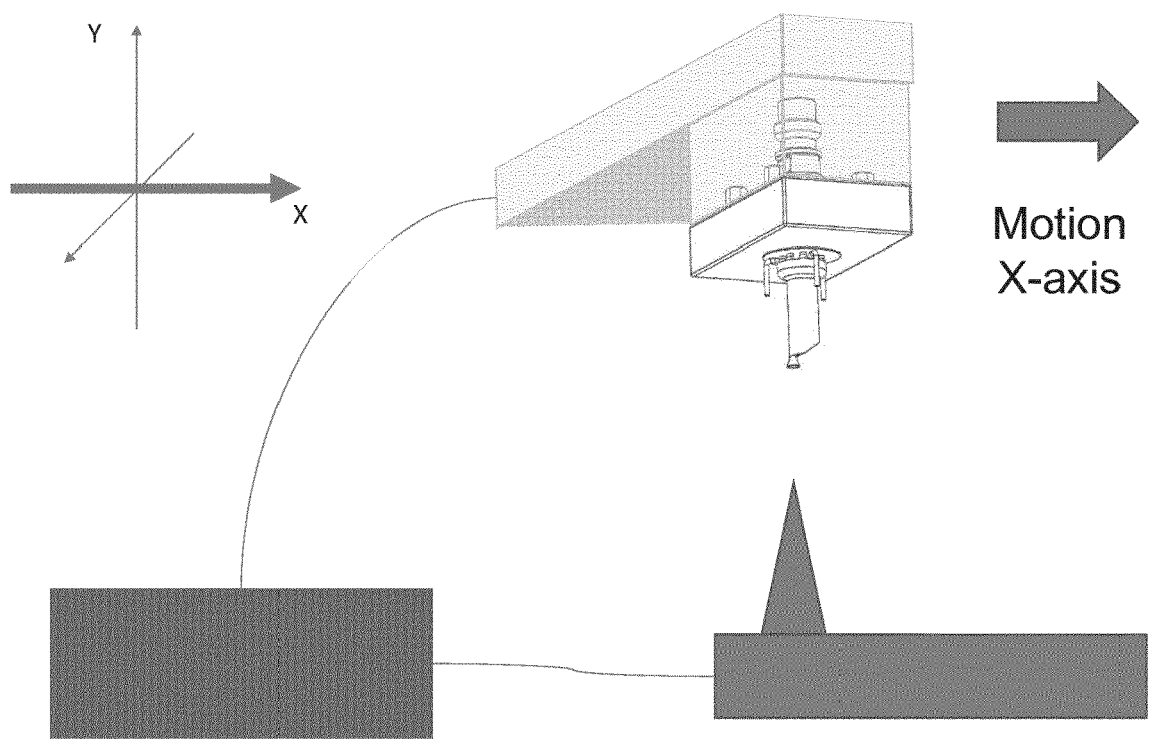
Figure 13:
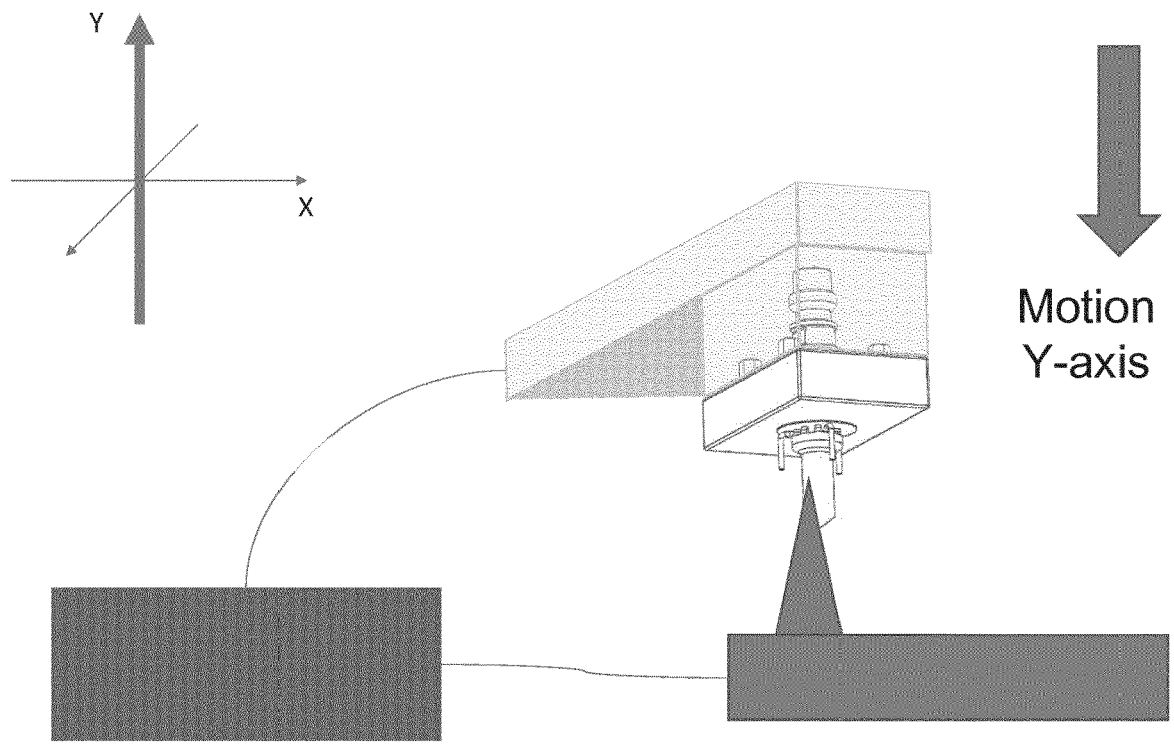
Figure 13:
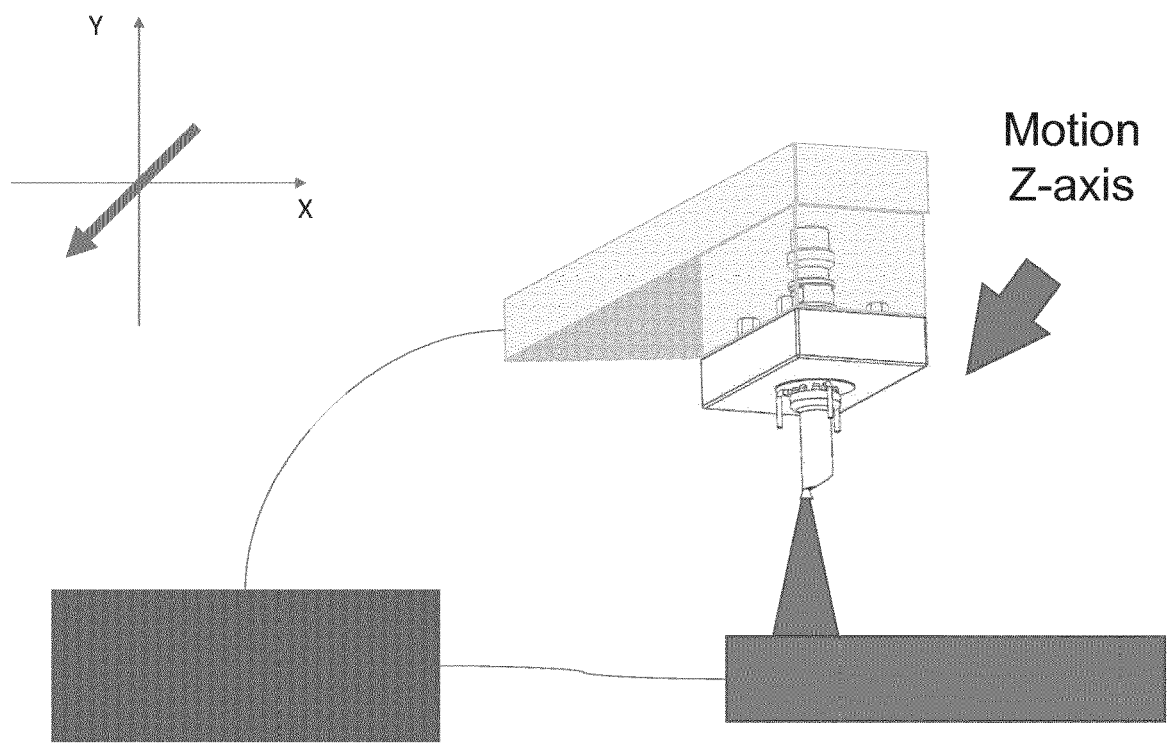

2. A frame or similar that comprises actuators (linear actuators, belt drives, robot arms, etc.) supporting the precise movement of a mould (with or without the build platform), and/or the filling outlets, e.g. by tracking their positions relative to one another. A Cartesian or polar coordinate system, linear encoding or a similar system that supports navigation in an X, Y and optionally a Z plane may be used for this kind of tracking. In a particular embodiment, the Cartesian coordinates (X, Y, Z) of mould filling inlets are stored in a mould inlet positioning file that may be read by a controller program. Said controller program may use these coordinates to determine one or more optimal positions for establishing operative connections between at least a first filling outlet and the corresponding filling inlet of at least a first mould and support the positioning of the outlets and inlets in these operative connections. See e.g. also FIG. 13.

Alternative embodiments comprise one or more laser tracking systems, magnetic tracking systems, or similar mechanisms of tracking that will allow for accurate positioning of a mould inlet to a position where it may receive and operatively connect to a filling outlet.

In some embodiments, the additive manufacturing device 100 further comprises or is connected to at least one moulding reservoir or container comprising at least one building material where the additive manufacturing device 100 is further adapted to introduce building material directly or indirectly from the at least one moulding reservoir or container into the one-piece additively manufactured mould 201 after it has been manufactured.

In this way, an object or an entire series of objects that are either identical or individually shaped may readily be created by the additive manufacturing device 100 using a one-piece additively manufactured mould manufactured by the same device.

Alternatively in other embodiments, a separate moulding system (see e.g. 500 in FIGS. 9-12) may be part of an overall system, in which case this system may be responsible for post-print cleaning of one or more moulds, as well as moulding and optionally post-curing of an object using the one or more one-piece additively manufactured moulds 201. In such cases, the additive manufacturing device does not necessarily need to be adapted to introduce building material.

Variations and/or alternatives in relation to the moulding process of the additive manufacturing device 100 may e.g. be similar to the variations and/or alternatives as mentioned throughout the present specification for the separate moulding system 500.

In some embodiments, the one-piece additively manufactured mould 201 may comprise two or more separate compartments or the like, where e.g. each compartment may separately be filled with building material. The separate compartments may be created by the additive manufacturing device 100 e.g. by creating one or more dividing internal walls that splits an internal cavity of the mould 201 into two or more compartments.

This e.g. enables that objects may be manufactured that are comprised of two or more different materials.

In some embodiments, the additive manufacturing device 100 is adapted to fill out certain one or more portions (such as a back portion) of a one-piece additively manufactured mould 201 with cheaper material thereby reducing costs while creating solid objects. This may e.g. be done after the additively manufacturing process creating the mould.

In some embodiments, the additive manufacturing device 100 is adapted to create at least one mesh or other suitable structures in the walls of the mould when the mould is being additively manufactured. This reduces material consumption while maintaining structural integrity of the mould walls.

In some embodiments, the additive manufacturing device 100 is adapted to create at least one mesh or other suitable structures in one or more inner first volumes of the mould when the mould is being additively manufactured. This mesh or other suitable structures may advantageously, but not necessarily, be made of dissolvable or other relatively easily removable material(s).

In this way, the formation of (even complex) channels, etc. is easily provided by removing the material of the mesh or suitable structures after an object has been cast and potentially cured.

Figure 2:
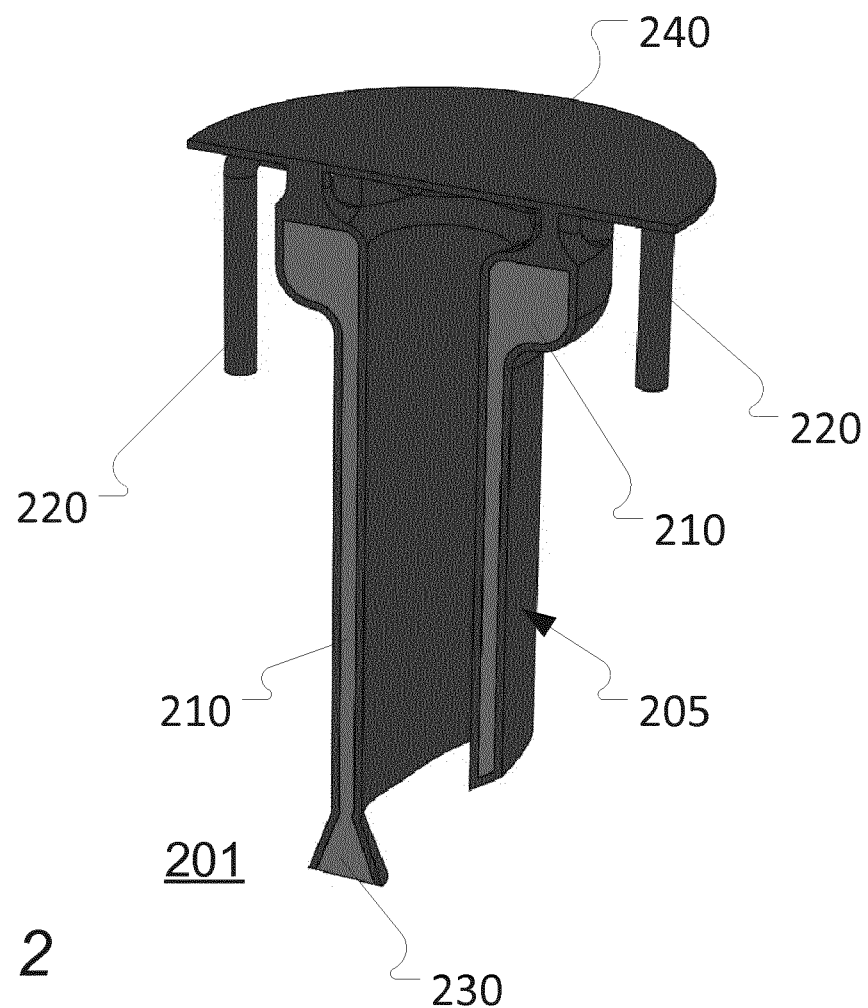
FIG. 2 schematically illustrates a cross-sectional view of a one-piece additively manufactured mould being manufactured by an additive manufacturing device as illustrated in FIG. 1.

FIG. 2 schematically illustrates a cross-sectional view of a one-piece additively manufactured mould being manufactured by an additive manufacturing device as illustrated in FIG. 1.

Shown is an exemplary one-piece additively manufactured mould 201 e.g. as manufactured by the additive manufacturing device and embodiments thereof described in connection with FIG. 1 and elsewhere. The specifically shown one-piece additively manufactured mould 201 is a cast moulding mould.

As mentioned previously, the one-piece additively manufactured mould 201 comprises one or more outer shells or a mould body 205 circumscribing and enclosing at least a first inner volume 210, at least one inlet 230 being connected to the first inner volume 210 where the at least one inlet 230 is adapted to receive at least one building material. The one-piece additively manufactured mould 201 further comprises at least one outlet 220 being connected to the first inner volume 210 and being adapted to release air or gas from the first inner volume 210 when the first inner volume 210 receives the at least one building material via the at least one inlet 230.

In some embodiments, and as shown, the one-piece additively manufactured mould 201 further comprises an attachment base or part 240 for attachment to a build surface of a build platform (see e.g. 107 and 105 in FIG. 1).

Figure 4:
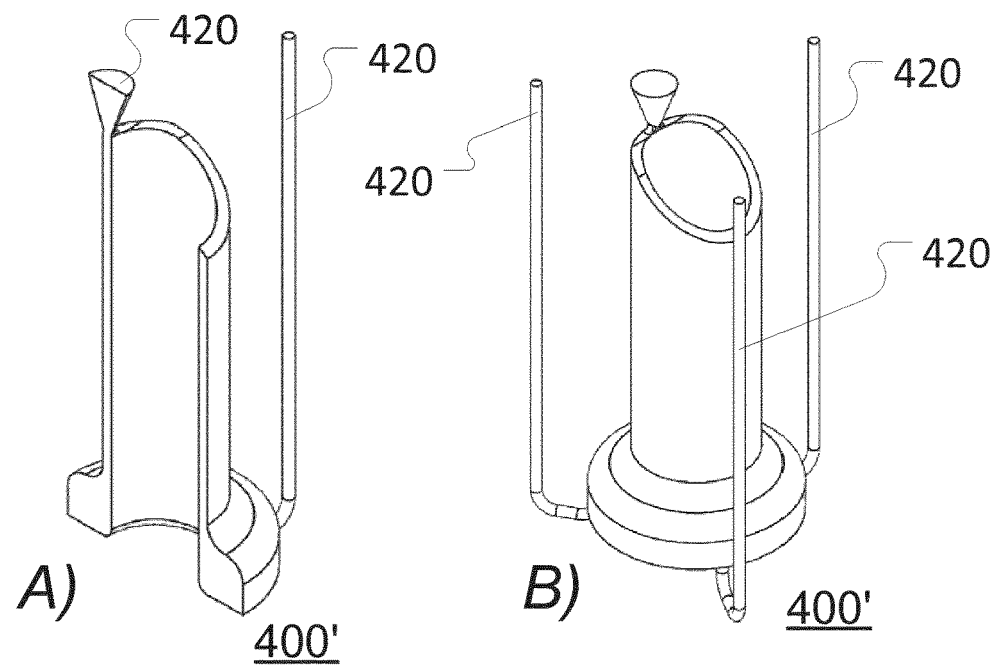
FIGS. 4a and 4b schematically illustrate an object created using a one-piece additively manufactured mould (before trimming) being manufactured by an additive manufacturing device as illustrated in FIG. 1.

An exemplary moulded object using the exemplary mould 201 of FIG. 2 is shown in FIG. 4 (after optional post-curing, but before trimming/removal of unwanted parts) and 5 (after trimming/removal of unwanted parts).

In some embodiments, and as shown, the end of the inlet 230 may comprise a funnel shape or the like. This enables easy alignment, e.g. with automated filling equipment (see e.g. also FIGS. 13 and 14).

It is of course to be appreciated, that the one-piece additively manufactured mould 201 may look and be very different depending of specific use or purpose.

FIGS. 3a-3c schematically illustrate different views of a build platform of an additive manufacturing device as illustrated in FIG. 1.

Shown in FIG. 3a is a cross-sectional perspective view of a build platform 105 according to some embodiments shown together with a one-piece additively manufactured mould 201 that is attached or secured to the build platform 105.

The build platform 105 comprises one or more securing elements (here as an example only one and also shown as a cross-sectional view) 235 enabling a transportation mechanism (see e.g. 110 in FIGS. 1 and 12) to mechanically, and preferably releasably, connect with the build platform 105. The one or more securing elements 235 may e.g. be used to a) load the build platform 105 into the additive manufacturing device and/or b) unload the build platform 105 from the additive manufacturing device to subsequently transport it for handling and/or processing at another location or system as part of an automated process, e.g. as illustrated in connection with FIG. 12.

In the particular shown embodiment, the securing element 235 is particularly an Erowa spigot or similar, mating with other tools or equipment like a standardised industrial chuck, like an Erowa chuck. Alternatively, other releasably securing elements may be used e.g. like screw, rail, clamp, bayonet clamp, magnet, vacuum, etc. elements.

In some embodiments, and as shown, the shown securing element 235 comprises a first and a second securing part or point 301, 302, especially gripping parts or points e.g. in the form of a substantially square exterior, enabling a suitable transportation mechanism to securely connect with the build platform 105 facilitating expedient loading, unloading, and other handling operations. Such other handling operations may e.g. comprise loading a build platform 105 into a connecting device that is part of a cleaning and/or coating and/or curing and/or filling device and/or other post-processing device, such as disclosed in the present specification and accompanying claims.

In some further embodiments, and as shown, the securing element 235 comprises a number of guiding elements 303 and/or a number of guidance cavities 304 facilitating proper placement in tools, equipment, etc.

The one or more securing elements 235 enables the build platform 105 to be handled by or secured to at least one transportation mechanism (see e.g. 110 in FIG. 6 and elsewhere) e.g. like standardised handling and/or processing equipment such as a robotic arm, conveyer, or other equipment that can move the build platform 105 within an additive manufacturing device and/or to another part in a manufacturing and/or processing process (see e.g. FIG. 12).

The shown build platform 105 and embodiments thereof may also be usable with other additive manufacturing devices than ones as illustrated in FIG. 1 to enable a highly automated process that comprises loading a build platform 105 into a connecting device that e.g. is part of a cleaning and/or coating and/or curing and/or mould filling device and/or other post-processing device, such as disclosed in the present specification and accompanying claims, and/or other mould handling systems.

In this way, the build platform 105 functions also as a carrier that may transport a mould 102 through-out an entire overall process comprising one or more sub-processes. See e.g. also FIG. 12.

Shown in FIG. 3b is a full perspective view of the build platform 105 of FIG. 3a.

Shown in FIG. 3c is a full perspective view of the build platform 105 of FIGS. 3a and 3b shown from another direction than in FIG. 3b.

FIGS. 4a and 4b schematically illustrate an exemplary object created using a one-piece additively manufactured mould (before trimming) being manufactured by an additive manufacturing device as illustrated in FIG. 1.

Shown is a moulded object 400' e.g. created using the exemplary mould of FIG. 2. FIG. 4a illustrates a cross-sectional perspective view of the moulded object 400' while FIG. 4b illustrates a full perspective view.

The moulded object 400' is shown as it is when being just released from the mould that created it and includes unwanted parts 420 that would be removed in an appropriate fashion to provide the finalised object. The unwanted parts 420 arises due to the casting moulding process also filling—at least to an extent—the inlet(s) and/or outlet(s) (see e.g. 220 and 230 in FIG. 2) of the mould with building material.

Figure 5:
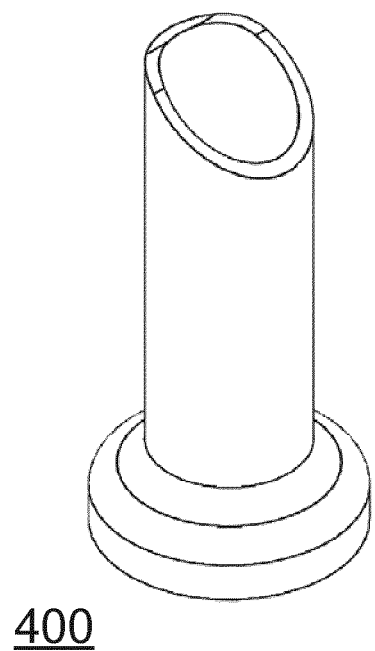
FIG. 5 schematically illustrates the object of FIGS. 4a and 4b after trimming/removal of unwanted parts.

The moulded object 400' is shown in FIG. 5 as a finalised object (400) after the trimming/removal of unwanted part(s).

FIG. 5 schematically illustrates the object of FIGS. 4a and 4b after trimming/removal of unwanted parts.

Shown is an exemplary finalised moulded object 400 after the trimming/removal of unwanted part(s).

Figure 6:
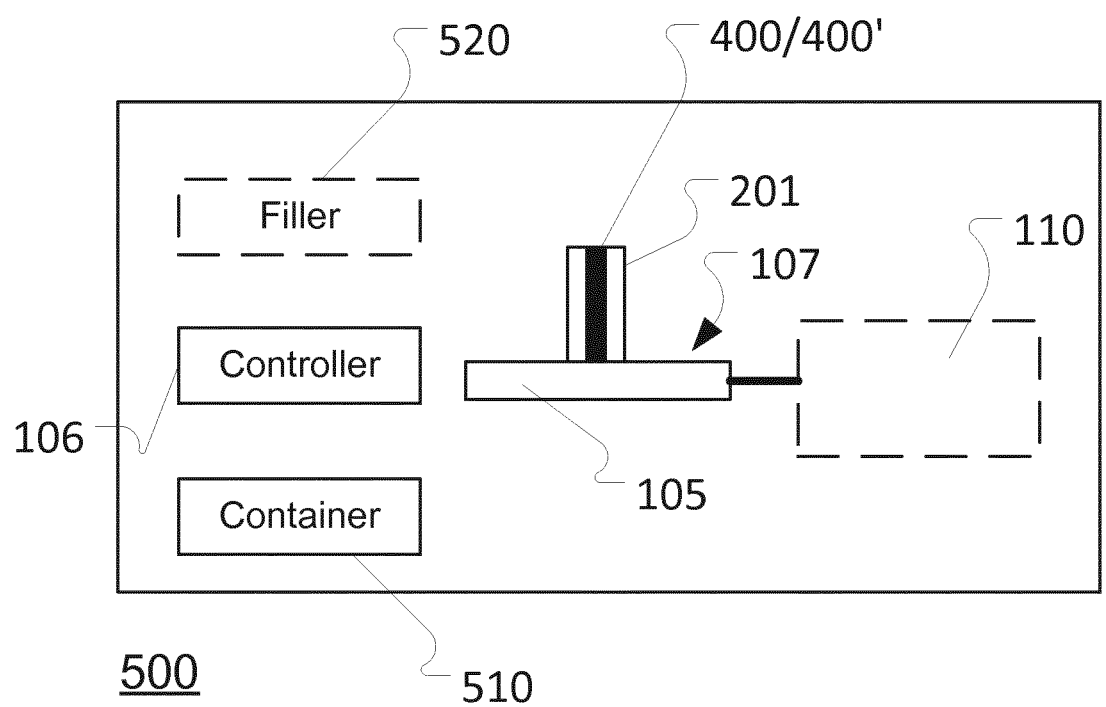
FIG. 6 schematically illustrates a moulding system for moulding an object using a one-piece additively manufactured mould manufactured by an additive manufacturing device as illustrated in FIG. 1.

FIG. 6 schematically illustrates a moulding system for moulding an object using a one-piece additively manufactured mould manufactured by an additive manufacturing device as illustrated in FIG. 1.

Schematically illustrated is a moulding system 500 according to some embodiments for moulding an object 400, 400' using a one-piece additively manufactured mould 201 manufactured by an additive manufacturing device, e.g. the one and embodiments thereof as shown in FIG. 1.

The mould 201 is supported or attached to a build surface 107 of a build platform 105 e.g. as described elsewhere.

Optionally, the moulding system 500 comprises a transportation mechanism 110 being adapted to automatically move a one-piece additively manufactured mould 201 or the build platform 105 comprising the one-piece additively manufactured mould 201 out and away from the moulding system 500 e.g. to a further stage in an automated process. The transportation mechanism 110 may also—alternatively or as an addition—be adapted to move the one-piece additively manufactured mould 201 or the build platform 105 comprising the one-piece additively manufactured mould 201 into the moulding system 500 for use.

The transportation mechanism 110 may e.g. correspond to the transportation mechanism as described elsewhere.

The transportation mechanism 110 may e.g. also be external to the moulding system 500.

The moulding system 500 comprises or is in connection with at least one moulding reservoir or container 510 comprising at least one building material to be used in a moulding process, e.g. as described earlier and/or in connection with FIGS. 9-11.

The moulding system 500 is further adapted to introduce building material directly or indirectly from the at least one moulding reservoir or container 510 into the one-piece additively manufactured mould 201, e.g. as described earlier and/or in connection with FIGS. 9-11. Alternatively but less preferably, the building material is introduced manually.

Additionally, the moulding system 500 may be adapted to actively or passively solidify the introduced building material thereby producing an object 400, 400' as defined by the one-piece additively manufactured mould 201.

Figure 3:
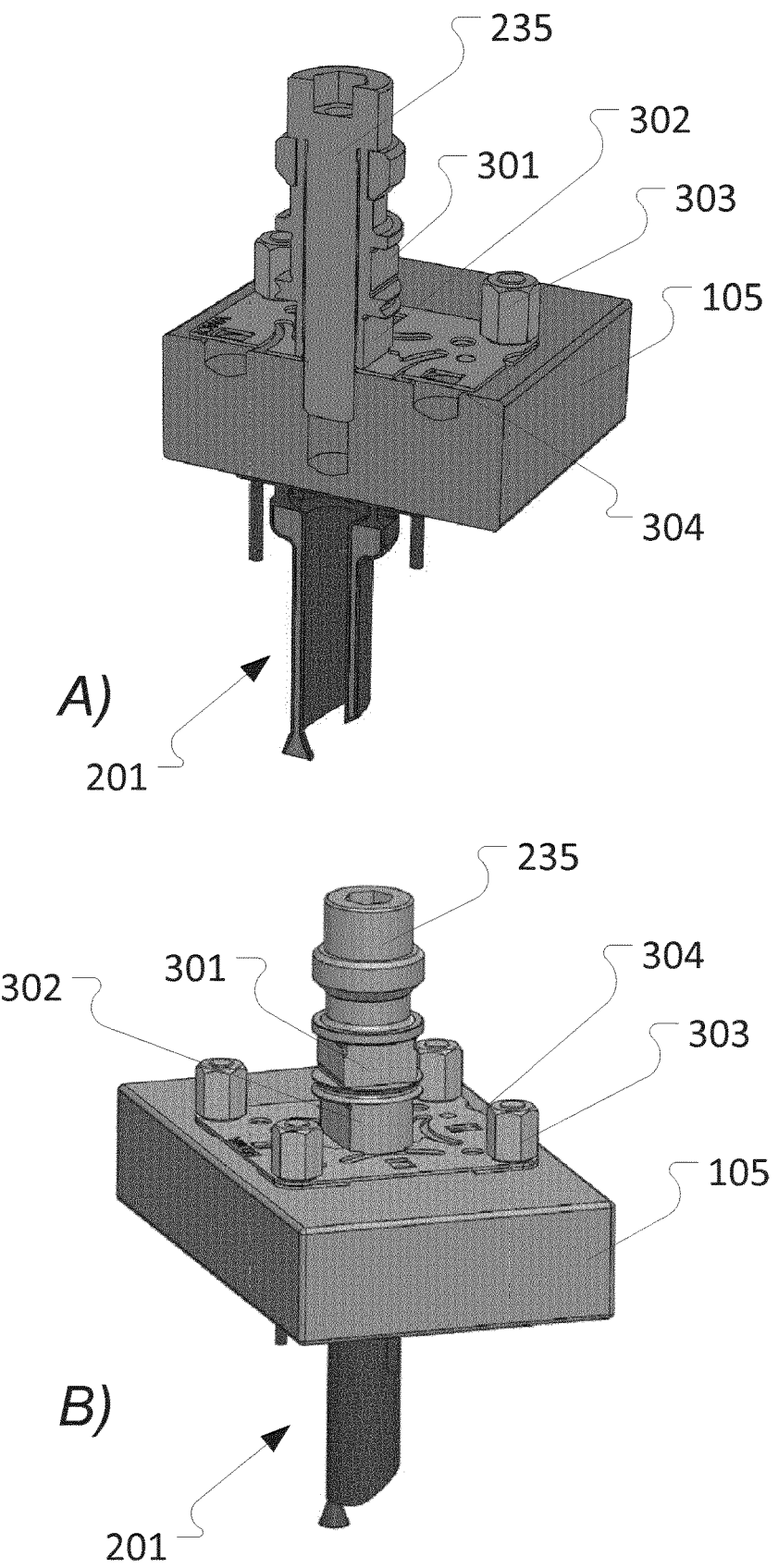
FIGS. 3a-3c schematically illustrate different views of a build platform of an additive manufacturing device as illustrated in FIG. 1.
Figure 3:
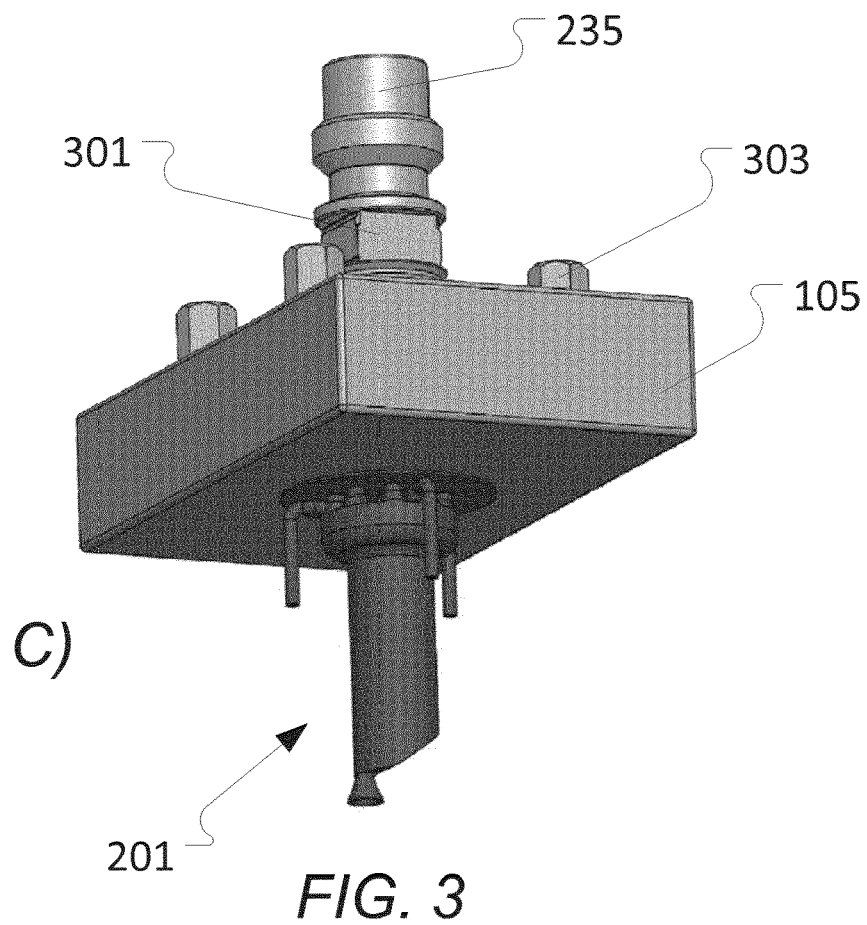

In some embodiments, the one-piece additively manufactured mould 201 is a cast moulding mould, e.g. as shown in FIGS. 2, 3, and 7. In some further embodiments, the building material comprises one or more silicones, such as one-component silicone, two-component silicone, etc., or other rubber or rubber-like material(s).

Alternatively, the building material comprises one or more ceramic or metal powders, and one or more epoxies, e.g. one-component epoxy, two-component epoxy, and/or one or more organic binders (e.g. paraffin, microcrystalline, carnauba, beeswax, vegetable, peanut oil, acetanilide, antipyrine, naphthalene, PEG, etc.), polyacetal binders (e.g. polyoxymethylene), etc.

Alternatively, the one one-piece additively manufactured mould 201 is an injection mould, e.g. as shown in FIGS. 8-11. For some applications, the building material is a thermoplastic resin (e.g. PEEK, POM, ABS, PA or similar). In other applications, the building material comprises one or more ceramic or metal powders and an organic binder, such as at least a paraffin, microcrystalline, carnauba, beeswax, vegetable, peanut oil, acetanilide, antipyrine, naphthalene, PEG, etc., and/or a polyacetal binder (e.g. polyoxymethylene), etc.

In some embodiments, the moulding system 500 further comprises a vision and/or Cartesian or polar coordinate positioning system (e.g. as described further in connections with FIGS. 1, 13, and 14) us as part of an automatic mould filler system. In some embodiments, the moulding system 500 is further adapted to optionally add one or more filler elements 520 to the building material when, or prior to, producing the object 400, 400'. The one or more filler elements 520 may e.g. also be applied to the mould prior to filling, at as part of a coating process.

The filler element(s) 520 may e.g. be comprised by an internal or external container, reservoir, etc.

In some embodiments, the one or more filler elements 500 comprises gas bubbles or physical spheres or other physical containers (forth only denoted as physical spheres), e.g. glass beads or the like, that comprise one or more substances that may either be contained in the spheres throughout the manufacturing process or be released into the building material according to one or more predetermined criteria, such as being exposed to a predetermined catalyst or a predetermined energy level.

The gas bubbles may e.g. be gas bubbles created by introducing a pressurised gas into the building material where the pressurised gas comprises the one or more substances to be released. The pressure of the pressurised gas may e.g. be used to control the size of the gas bubbles in the building material.

Alternatively or in addition, the physical spheres may e.g. be pre-formed solid hollow containers comprising the one or more substances to be released.

In some embodiments, the one or more filler elements 520 (e.g. further) comprises one or more solid and/or powdered components, such as ceramic powder or particles, metallic powder or particles, glass powder or particles, glass beads, or glass fibres, carbon black or carbon powder or particles or nanotubes, and/or re-used or re-cycled plastic and/or resin powder.

In some embodiments, the building material comprises or further comprises one or more curing and/or hardening agents. This may e.g. be beneficial for certain building materials, such as those silicones or epoxies or other that are intended to cure at or about room or ambient temperature, potentially without further post-curing operations. In other embodiments (e.g. for injection moulding applications), the building material is adapted to cure by (natural or forced) cooling.

The shown moulding system 500 and embodiments thereof may also be usable with other additive manufacturing devices than ones as illustrated in FIG. 1.

FIG. 7 schematically illustrates an embodiment of an additive manufacturing device as illustrated in FIG. 1 with further details.

Illustrated is an additive manufacturing device 100 in the form of a bottom-projection based 3D printer comprising a container 101 with radiation-curable liquid 103, a movable build platform 105 where one or more one-piece additively manufactured moulds 201 may be formed by an additive manufacturing process as explained earlier.

An already manufactured mould 201 is shown attached to the build platform 105. Layers are formed by exposing radiation-curable liquid immediately adjacent to the already manufactured part to hardening radiation from a radiation source 102, for instance a Digital Light Processing (DLP) projector. A lens system may e.g. be involved to focus the light from the radiation source onto the radiation-curable liquid. A new layer is formed when radiation-curable liquid that is caught between the transparent floor of the container and build platform or the previously formed layer is exposed to the hardening radiation. The pattern of the new layer may e.g. be defined by a product definition file, a template or mask, etc.

In some embodiments, a controller (not shown; see e.g. FIG. 1) controls the motion of the build platform, the intensity of the hardening radiation, and the image provided by the projector.

When the new layer 412 is formed, it is essentially glued to the floor of the vat. To form a new layer, the newly formed layer must be released from the floor, and the movable build platform 105 will be raised some distance. This is repeated until the mould(s) 201 have been manufactured completely.

The build platform 105 comprises one or more securing elements 235, e.g. as shown and explained in connection with FIG. 3, that are mechanically, and preferably releasably, connected with a correspondingly mating tool or equipment like a standardised industrial chuck 236 that itself it is connected to a transportation mechanism 110 capable of moving the build platform 105 at least up and down.

In some embodiments, the build platform with the one or more securing elements 235 may be loaded into the additive manufacturing apparatus by manual means or an automated transportation mechanism prior to the commencement of additive manufacturing. The one or more securing elements 235 of the build platform 105 may establish an operative connection with one or more securing elements 236 of the additive manufacturing device, at which point the additive manufacturing device is ready to commence additive manufacturing. Following additive manufacturing of one or more moulds, the securing elements or elements of the build platform may be released, and the build platform may be unloaded from the additive manufacturing device either manually or by an automated transportation mechanism.

FIGS. 8*a*-8*c* schematically illustrate a cross-section of one embodiment of a one-piece additively manufactured mould being secured to an exemplary embodiment of a transportation mechanism.

Shown in FIG. 8*a* is another example of a one-piece additively manufactured mould 201 in the form of an injection moulding mould and a transport mechanism 110.

As previously explained, the mould 201 comprises one or more outer shells or a mould body 205 comprising a first inner volume 210 connected to at least one outlet 220 and at least one inlet 230.

In this particular and corresponding embodiments, the mould 201 further comprises a section with a draft supporting release, as well as a retention hole or similar 801 for facilitating placement in an injection moulding device and a number of, here two, holes, openings, etc. 802 for engaging with the transport mechanism 110.

In this particular and corresponding embodiments, the transport mechanism 110 comprises a number of, here two, securing elements 235 here in the form of holder pins or the like that are movable in the directions as indicated by the arrows.

In FIG. 8*b* is illustrated moving the transport mechanism 110 towards the mould 201 as indicated by the arrow for engaging with and securely holding the mould 201 where the securing elements or holder pins or the like 235 should align with the corresponding holes, openings, etc. 802 of the mould 201.

In FIG. 8*c* is illustrated the transport mechanism 110 engaging with the mould 201 where the securing elements or holder pins or the like 235 then are moved as indicated by the arrows once inside the holes, openings, etc. 802 to securely lock the mould 201 to the transport mechanism 110. The securing elements or holder pins or the like 235 may alternatively also be moved in other directions in order to lock the connection.

This effectively enables automated pickup and movement of a mould 201 that then may be moved to any desired position e.g. as part of a complete and fully-automated object manufacturing process, e.g. as will be explained further in connection with FIG. 12 and as explained elsewhere.

Alternatively, other types of suitable securing elements 235, 802 may be used.

The mould 201 may e.g. be moved to (and from) a separate suitable moulding system, e.g. as shown and explained in connection with FIG. 9.

FIGS. 9*a*-9*h* schematically illustrate a one-piece additively manufactured mould and an exemplary embodiment of a moulding system manufacturing an object.

FIGS. 9*a*-9*h* illustrate different stages of a moulding or object manufacturing process using an injection moulding system and a mould as explained earlier and elsewhere.

Shown in FIG. 9*a* is a moulding system 500 here in the form of an injection moulding system.

The injection moulding system 500 comprises in this and corresponding embodiments, a tool stationary part 508 and a tool movable part 501.

The tool stationary part 508 comprises a sprue or the like 510 and a number of guide elements, pins, etc. 507.

The tool movable part 501 comprises an ejector pin rod or the like 901 having a number of ejector pins or the like 504 and an ejector pin spring or the like 902 as generally known.

The tool movable part 501 further comprises a number of ejector pin holes or the like 505 for receiving the ejector pins, etc. 504 when releasing or ejecting a contained mould and a retention pin or the like 506 for mating with a retention hole or similar of a mould (see e.g. 801 in FIG. 8*a*) to promote or enable a releasable attachment of the mould to the tool. Suction elements, e.g. vacuum suction or similar mechanisms of attachment may also be used to hold the mould in place in the tool while the tool is not closed.

Additionally, the tool movable part 501 comprises a tool cavity or the like 502 for receiving a mould and a number of guide elements, holes, etc. 503 for facilitating proper alignment of the tool stationary 508 and movable part 501 by aligning and engaging with the guide elements, pins, etc. 507.

Figure 8:
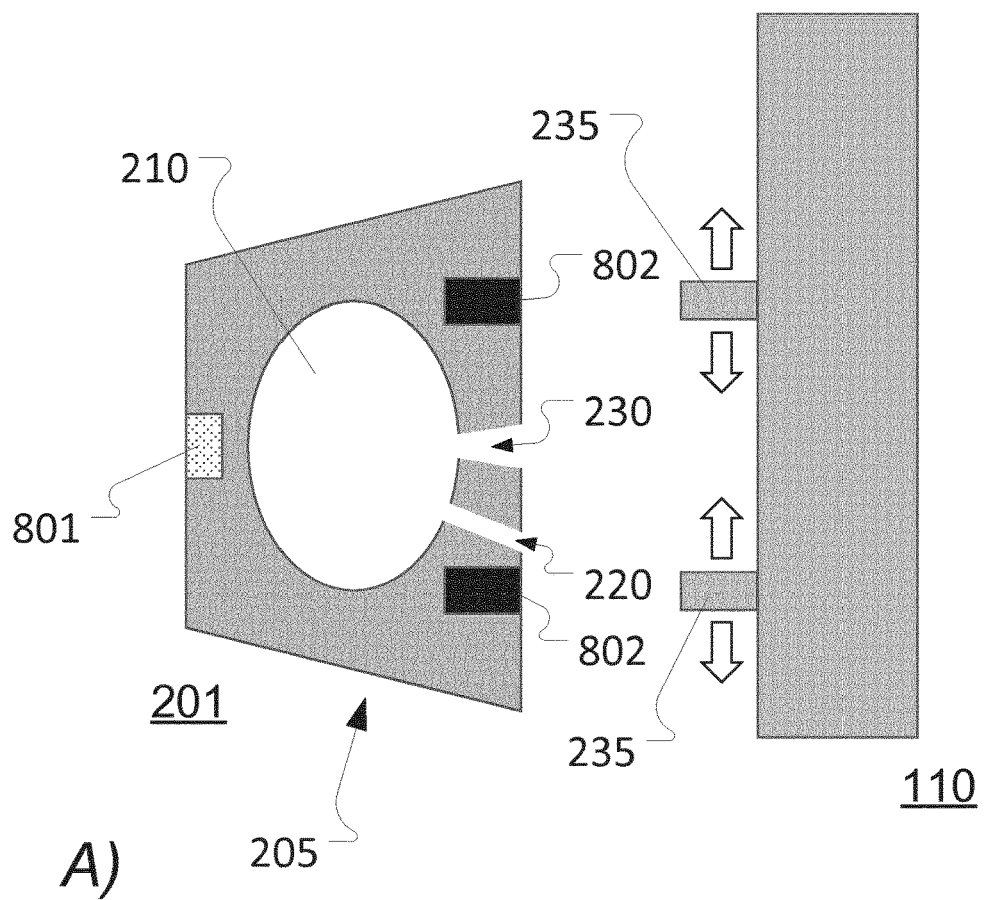
FIGS. 8a-8c schematically illustrate a cross-section of one embodiment of a one-piece additively manufactured mould being secured to an exemplary embodiment of a transportation mechanism.
Figure 8:
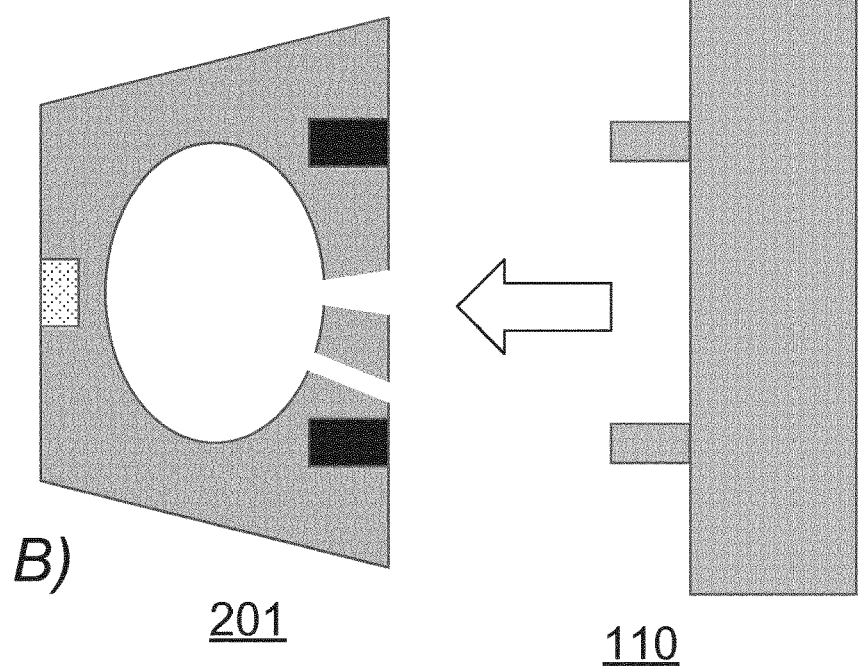
Figure 8:
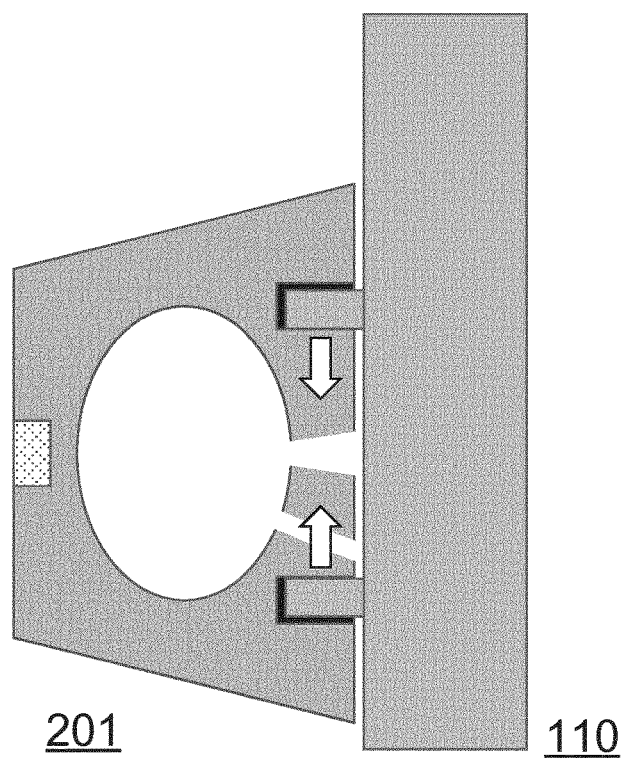

Further shown is a transport mechanism 110 holding a mould 201 e.g. as shown in FIG. 8.

Illustrated by the two arrows is the movement of the mould 201 by the transport mechanism 110 into place in the tool cavity or the like 502.

In FIG. 9*b*, the mould 201 has now been placed properly in the tool cavity or the like 502 of the tool movable part 501.

In FIG. 9*c* is illustrated the release of the mould 201 from the transport mechanism 110 that then is moved as indicated by the two arrows out of the injection moulding system 500 (or at least moved out of the way).

In FIG. 9*d* is illustrated the injection moulding system 500 prior to the actual moulding where the tool movable part 501 has been moved as indicated by the arrow to engage with the tool stationary part 508 as generally known. Further shown now is also a conduit 511 containing the least one building material 515 to be used for moulding and having a nozzle or the like 512 engaging with the sprue or the like 510.

In FIG. 9*e*, the at least one building material 515 is introduced, as indicated by arrow 513, into the sprue or the like and further into the mould 201 and filling it as part of the injection moulding process.

In FIG. 9*f*, a moulded object 400, 400' have been created and the tool movable part is moved away from the tool stationary part, which also may create an unwanted part 520 of the moulded object 400, 400'.

In FIG. 9*g*, the ejector pin rod or the like is activated (manually or automatically) to release the mould from the tool movable part as shown in FIG. 9*h* where the mould including the created object then may be retrieved.

FIGS. 10*a*-10*d* schematically illustrate a one-piece additively manufactured mould being handled by the transportation mechanism of FIGS. 8*a*-8*c* in the moulding system of FIGS. 9*a*-9*h*.

FIGS. 10*a*-10*d* are alternative steps to FIGS. 9*g* and 9*h*.

FIG. 10*a* illustrates the same situation or stage as FIG. 9*f*.

But instead of using a ejector pin rod or the like to release the mould, the transport mechanism 110 is instead automatically moved in and engaging and locking with the mould again (potentially removing the unwanted part 520 of the moulded object in the process) and subsequently moving the mould including the created object elsewhere, as illustrated by FIGS. 10*a*-10*d*.

Retrieving the mould and object automatically by a transport mechanism 110 again enables a highly automated object manufacturing process using a mould, as will be explained further in connection with FIG. 12 and elsewhere.

FIGS. 11*a*-11*d* schematically illustrate a one-piece additively manufactured mould being handled by an alternative transportation mechanism in the moulding system of FIGS. 9*a*-9*h*.

Figure 9:
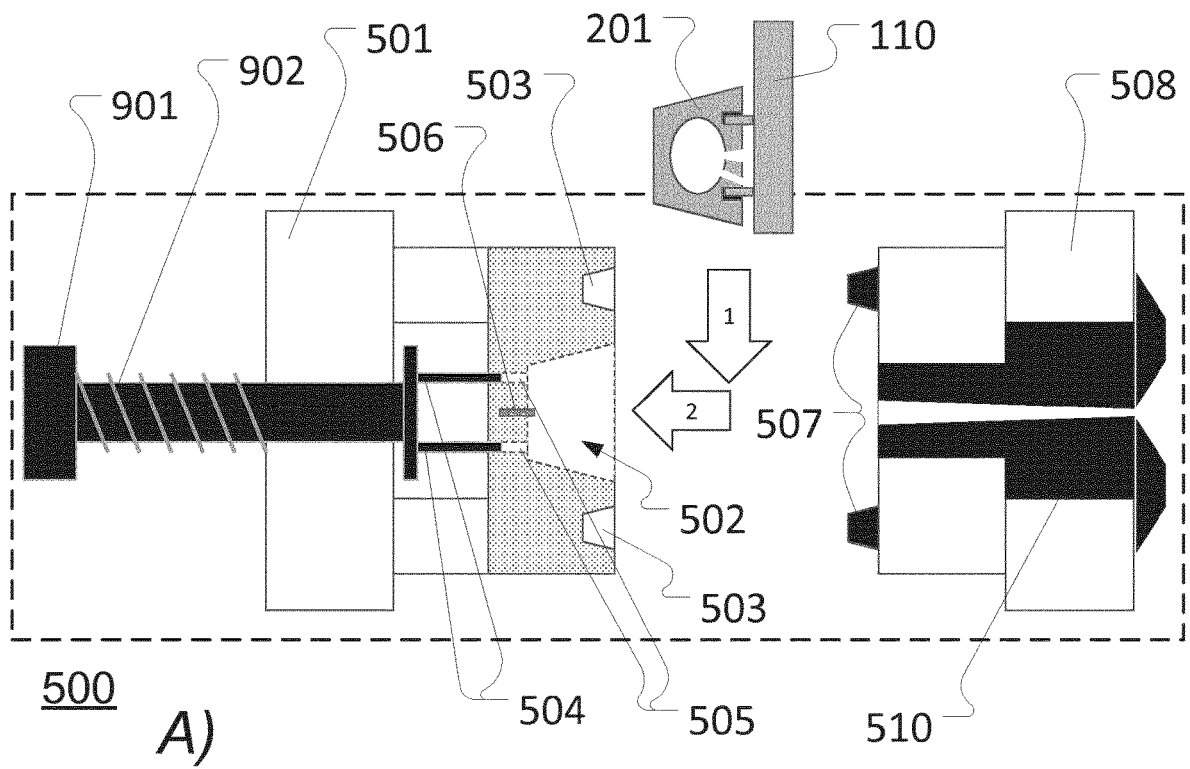
FIGS. 9a-9h schematically illustrate a one-piece additively manufactured mould and an exemplary embodiment of a moulding system manufacturing an object.
Figure 9:
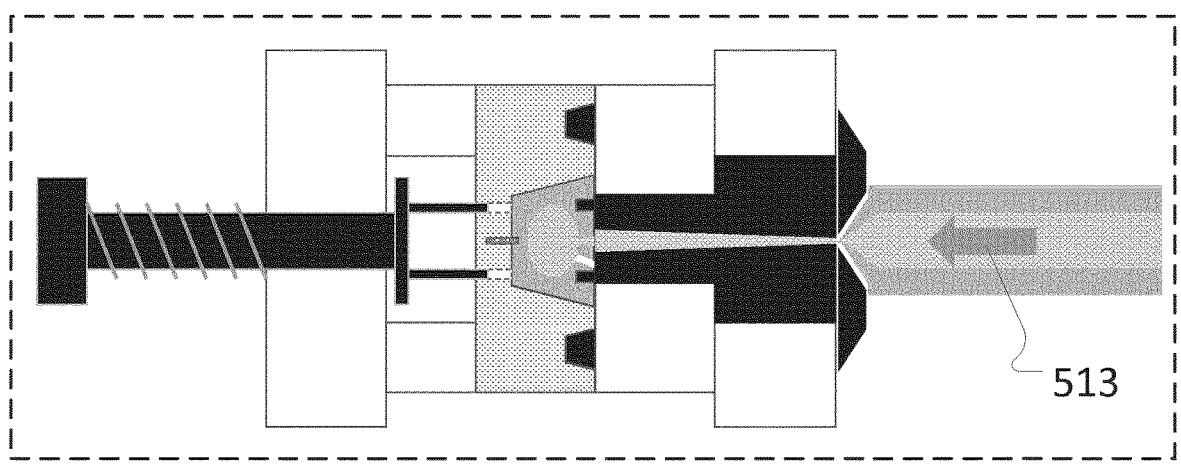
Figure 9:
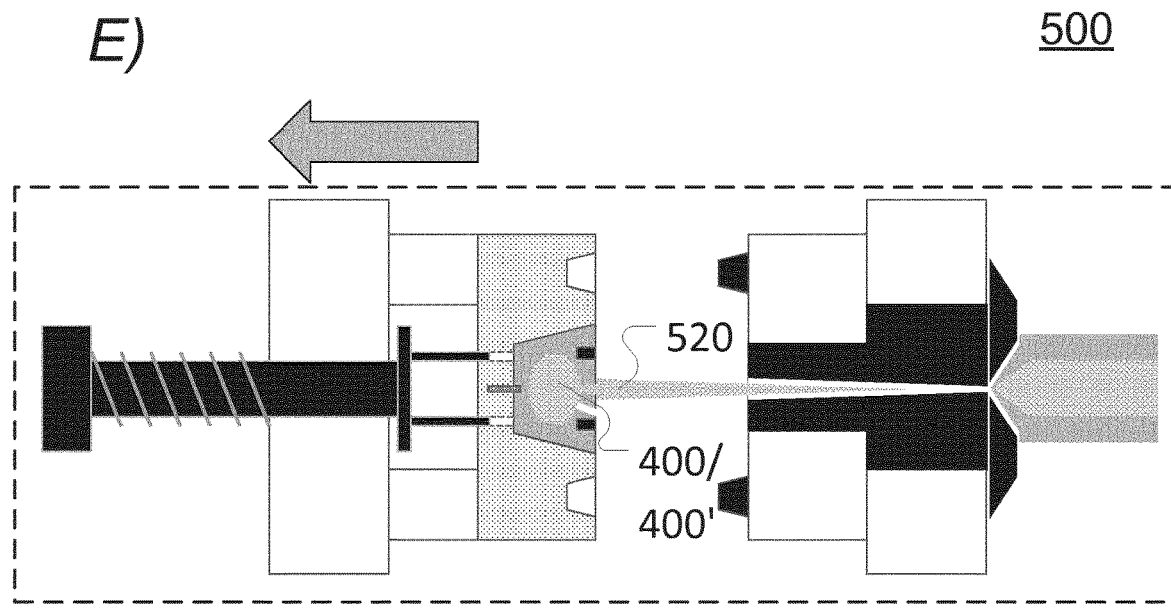
Figure 9:
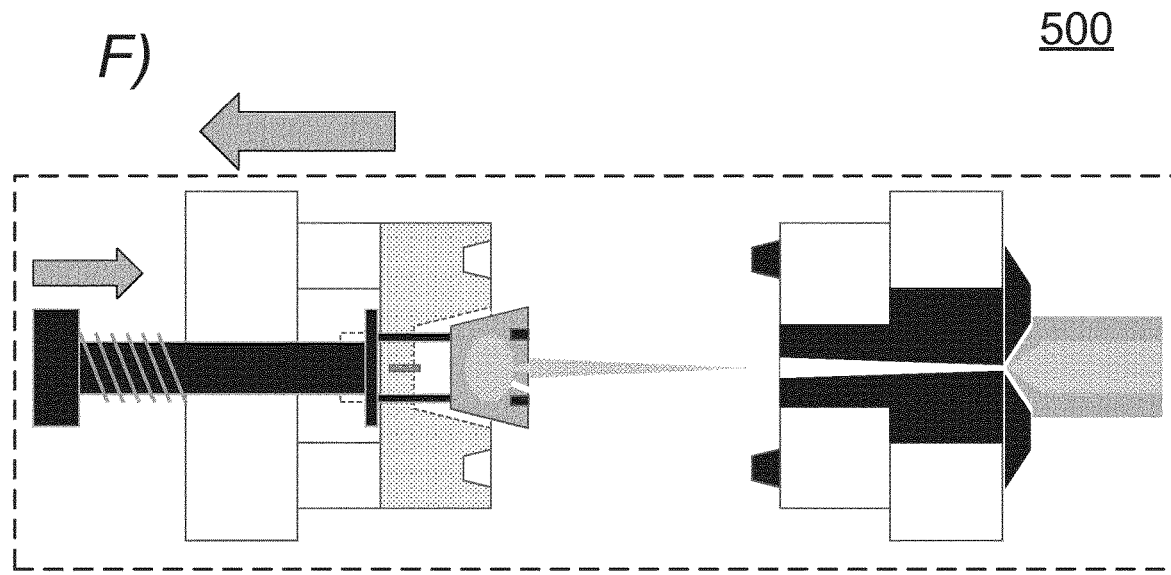
Figure 9:
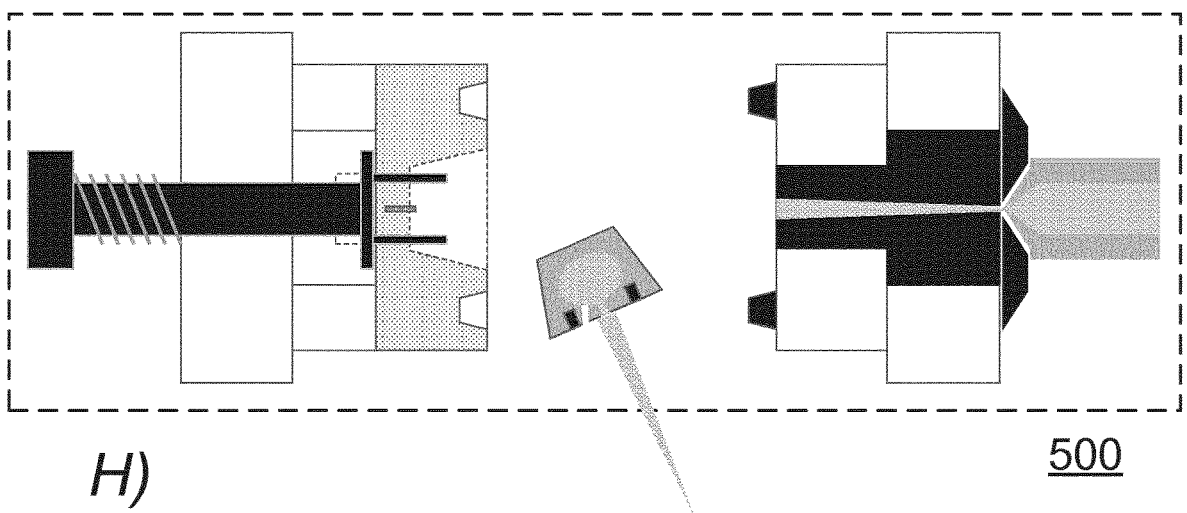
Figure 10:
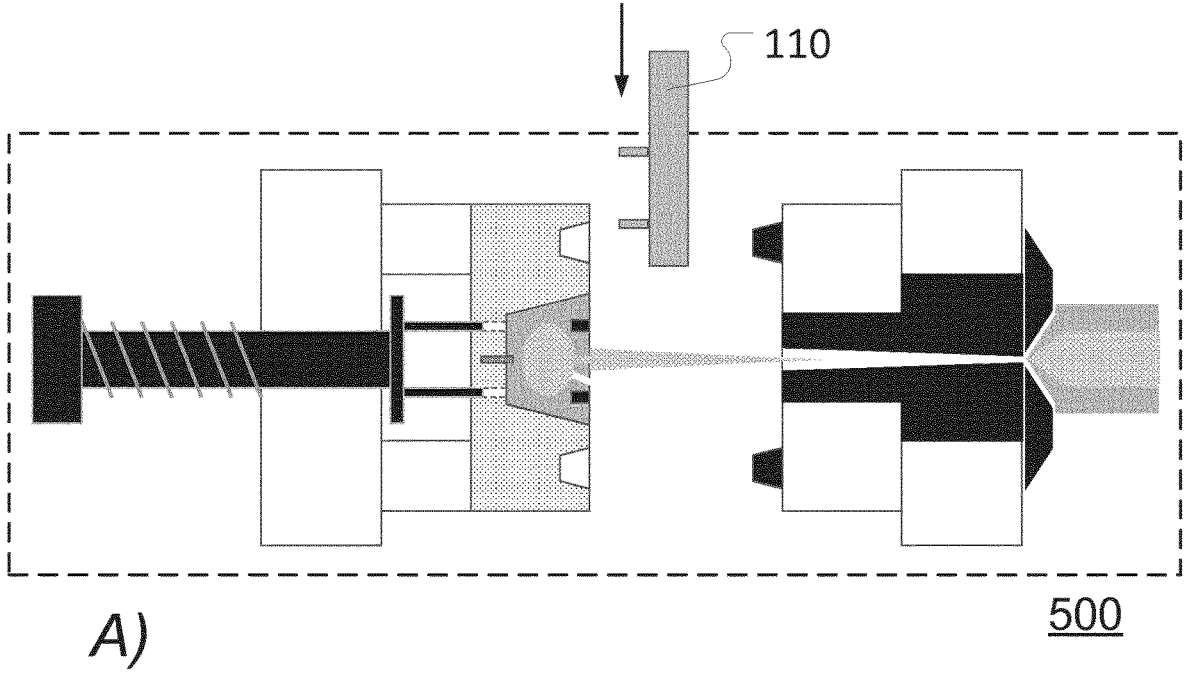
FIGS. 10a-10d schematically illustrate a one-piece additively manufactured mould being handled by the transportation mechanism of FIGS. 8a-8c in the moulding system of FIGS. 9a-9h.
Figure 10:
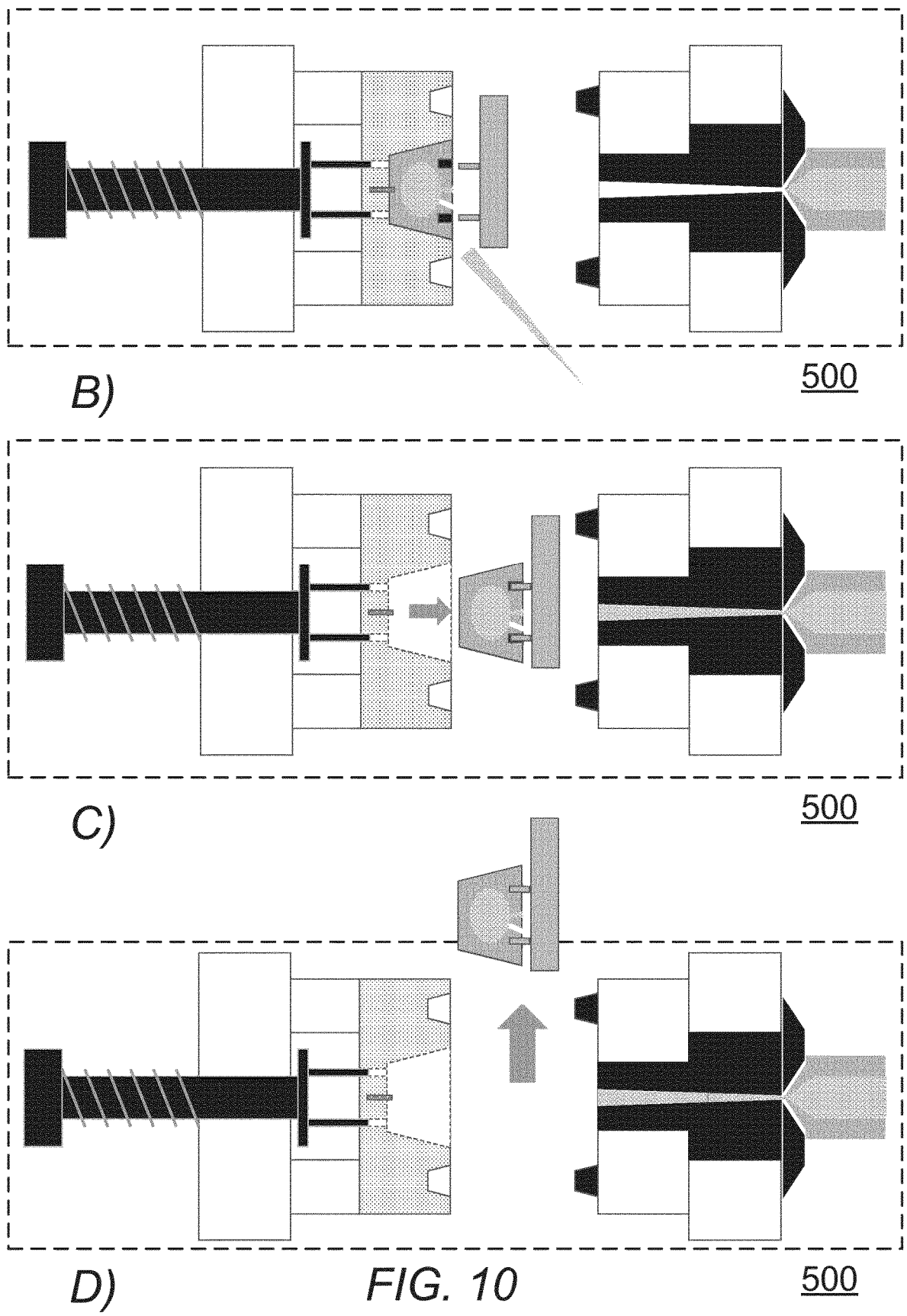

Shown in FIG. 11*a* is a moulding system in the form of an injection moulding system comprising a tool stationary part 508 corresponding more or less to the one shown in FIGS. 9 and 10.

Also shown is a mould one-piece additively manufactured mould 201 in the form of an injection moulding mould, corresponding to the one shown in FIG. 8, and a transport mechanism 110.

The mould 201 is attached or secured to a build platform 105 comprising one or more securing elements 235 specifically being an Erowa spigot or similar that is connected with a correspondingly mating tool or equipment like a standardised industrial chuck 236 that itself it is connected to the transportation mechanism 110. This may correspond to elements shown in FIG. 3 or alternatively to a connecting element that is a part of the movable tool part of the injection mould (not shown).

In this and corresponding embodiments, the transport mechanism 110 generally functions as a part of the tool movable part or as the tool movable part itself (501 in FIGS. 9 and 10).

In FIG. 11*b*, the mould is moved into place in the tool cavity or the like 502 as indicated by the arrow and in FIG. 11*c* at least one building material 515 is introduced, as indicated by the arrow, into the sprue or the like and further into the mould 201 and filling it as part of the injection moulding process and creating a moulded object 400, 400' e.g. comprising one or more unwanted parts 520.

In FIG. 11*d*, the mould 201 is a one-piece additively manufactured mould that is automatically moved away by the transport mechanism 110 e.g. for further processing elsewhere e.g. as part of an overall automated process or automated manufacturing system, e.g. as illustrated in connection with FIG. 12.

FIG. 12 schematically illustrates a manufacturing system that may employ the various embodiments of one or more additive manufacturing devices, moulding systems, and of one or more post-processing moulding system elements.

Shown is a manufacturing system 700 for manufacturing an object using a mould (see e.g. 400, 400' and 201 in the other Figures) where the manufacturing system 700 comprises one or more additive manufacturing devices 100 that produces a one-piece additively manufactured mould, one or more moulding systems 500 that fills the one-piece additively manufactured mould, and one or more transport mechanisms 110 as already described elsewhere.

Additionally, the manufacturing system 700 may e.g. comprise a post-processing moulding system 600 that may comprise one or more of the following elements:

a. A measurement element that allows mechanical measurement and/or visual and/or laser and/or CT and/or ultrasonic inspection of the compliance of the moulds with the required dimensional and/or other requirements used in defining the moulds and/or the finished objects.

b. A cleaning element that allows the automated cleaning of the one or more moulds after they have been removed from the additive manufacturing device and preferably before they are filled with building material, e.g. by immersing these in one or more cleaning agents that may e.g. comprise isopropyl alcohol, 2-(2-butoxyethoxy)ethanol or similar. The cleaning element may optionally be used to clean the finished objects once they have been removed from the moulds, and/or potentially as a release element if dissolvable mould material is used.

c. A coating element, that allows application of one or more coating agents to the moulds and/or the objects in or outside the moulds either before or after filling. Such coatings may for instance be diluted versions of the building material(s) used for the additive manufacture of the moulds, coatings comprising colouring agents, coatings containing glazing elements, coatings containing metallurgically active elements, coatings containing conductive elements and/or coatings providing other desirable characteristics.

d. A drying element that allows for drying of the moulds and/or the objects in the moulds after cleaning and/or coating and/or before filling of the moulds with building material, and/or the drying of the objects after the moulds have been removed e. A curing and/or post-curing element that supports UV-curing, thermal curing, or similar curing of the moulds before filling of the moulds with building material and/or the building material(s) in the moulds and/or the objects either before or after the moulds have been removed.

f. A smoothing element, that allows e.g. for thermal or mechanical smoothing of the surface of the one or more moulds prior to filling and/or of the objects after the moulds have been removed g. A mechanical mould removal element that may for instance comprise a mould removal mechanism similar to that of an automated 'nut cracker'.

h. A chemical mould removal element that may for instance comprise a vat holding water or a similar compound.

i. A thermal mould removal element that may for instance comprise a heater, a freezer, a liquid nitrogen source, a carbon dioxide/dry-ice source or a similar source of elevated or lowered temperature that support the melting or embrittlement of the mould to render it more susceptible to external influence.

j. A debinding element that allows for melting, decomposition, and/or evaporation of the moulds and/or binder materials that form part of the objects in the moulds as part of forming a finished object.

k. A sintering element that allows the sintering of the moulds and/or objects as part of forming a finished object.

l. A quality assurance element that allows an automated quality assurance process to take place between processes and/or after end of the final process m. A stacking element that supports the optimal packaging of moulds and/or finished objects in transport boxes or similar.

n. A packaging element that supports the automated packaging of moulds and/or finished objects.

As described, the individual post-processing element or elements may either precede the filling of the mould or they may happen simultaneously with the filling. Finally, they may be used after the filling.

Some of the post-processing elements may function discreetly, whereas other elements may be combined to form combined post-processing elements. A first example is the combination of a cleaning element and a coating element into a first combined post-processing element. A second example is the combination of mould removal and object debinding and/or sintering into a second combined post-processing element. Other post-processing elements as readily known to a person skilled in the art may also be used.

The one or more transport mechanisms 110 may automatically move a build platform into the additive manufacturing system 100, where a highly customisable mould may be produced, automatically move the build platform and the mould from the additive manufacturing system to the moulding system 500, where the object is created using an applicable moulding technique, and if desired move the created object (together with the mould if not already removed) to applicable post-processing system(s) 600 to finally provide a fully complete created object.

In this way, a fully automated object manufacturing system 700 is provided using one-piece, e.g. sacrificial, moulds made by additive manufacturing.

This readily enables fully automated larger scale production of objects based on additively manufactured sacrificial moulds.

The additively manufactured moulds also enable versatility in relation to the objects being produced. I.e. a certain object or a number of objects of one type may be produced and then switching over to another type of object or objects simply by manufacturing another mould, e.g as described earlier and elsewhere.

In some embodiments, the manufacturing system 700 comprises a coating system or coating mechanism adapted to apply a one or more coating substances to a one-piece additively manufactured mould 201 prior to the one-piece additively manufactured mould 201 being used for manufacturing an object at the moulding system 500. Coating may also be applied to an object after release from the mould 201, e.g. to treat or process the surface of the object.

In some embodiments, the post-processing moulding system 600 comprises a release element adapted to release the moulded object from the one-piece additively manufactured mould 201.

In some embodiments, the release element comprises one or more mechanical elements adapted to physically release the moulded object from the one-piece additively manufactured mould.

In some embodiments, the one-piece additively manufactured mould consist of dissolvable material and the release element is adapted to apply a dissolving agent to the one-piece additively manufactured mould thereby releasing the moulded object from the one-piece additively manufactured mould, e.g. where the goal is to create a green body that will subsequently undergo a debinding and/or sintering step (if applicable) to form e.g. a metal injection moulding object or a ceramic injection moulding object.

In some embodiments, the release element is adapted to apply, e.g. by a debinding and/or sintering process or element, a temperature within a predetermined range or above a predetermined temperature threshold to the one-piece additively manufactured mould thereby releasing the moulded object from the one-piece additively manufactured mould.

In some embodiments, the release element is adapted to apply a temperature within a predetermined range or below a predetermined temperature threshold to the one-piece additively manufactured mould thereby releasing the moulded object from the one-piece additively manufactured mould.

Some elements or features of the systems 100, 110, 500, and/or 600 may be combined or integrated with each other.

In some embodiments, one or more preferably all the build platforms 105 each comprise a unique identifier uniquely identifying the given build platform 105 (and thereby potentially the mould and/or the object manufactured specifically on a particular build platform 105). This enables precise information and/or control of what mould 201 and/or object 400, 400' is/are manufactured precisely at which build platform 105, which may also be used in an overall—e.g. fully or partly automated manufacturing and/or processing process (see e.g. FIG. 12), e.g. to determine where a given build platform 105 and its one or more moulds 201 and/or objects is/are to be moved to next. This further enables optimisation of the overall manufacturing process in various ways.

In some embodiments, the unique identifier is a radio frequency identification (RFID) tag or similar. In some embodiments, the unique identifier is a fiducial e.g. to be used in a vision or an imaging system, etc. In other embodiments, the unique identifier may e.g. be selected from the group of barcodes, dot matrix codes, laser engravings, colour codings or markings, or any other suitable unique identifier.

The whole process may be automated fully or partly. The whole process or parts thereof may also be carried out manually or semi-manually.

It should be noted, that the build platforms, moulds, objects, etc. do not need to move as indicated by the arrows and different build platforms, moulds, objects, etc. may be moved differently as the individual moulds, objects, etc. may not necessarily need to be handled and/or processed by the same equipment.

It should be noted, that further equipment may be used than the shown ones and one or more of the shown equipments may be omitted based on a given use. The ordering of the equipments may also be changed.

FIGS. 13a-13d schematically illustrate a X, Y, Z movement system for positioning a build platform and an element for introducing building material into a one-piece additively manufactured mould relative to each other.

Shown in FIG. 13a is a build platform 105 holding and/or supporting at least one mould 201 being or having been manufactured by an additive manufacturing process e.g. as already described elsewhere.

The build platform 105 comprises one or more securing elements 235 mating with one or more securing elements 236 of a transportation mechanism 110 e.g. as already described elsewhere.

The transportation mechanism 110 is capable of moving in an X, Y, Z Cartesian coordinate system, e.g. as already described elsewhere. A precise location in the Cartesian coordinate system may e.g. be obtained and tracked using one or more mechanical orientation elements and a tracking system e.g. with a linear encoder along each axis.

Further shown is a potentially movable element for introducing building material into a one-piece additively manufactured mould 1301 that comprises a filling spout 1302.

An electronic controller 106 controls the relative movement of the build platform 105 (and thereby the mould 201 and in particular the inlet(s) 230 of the mould) in relation to each other to automatically bring them in sufficient vicinity of each other to allow filling of the mould 201. One or both of the transportation mechanism 110 and the movable element 1301 may be moved.

This allows automatic alignment of the inlet 230 of the mould 201 with a filling element 1301.

In FIG. 13b, the (in this example) transportation mechanism 110 is moved the required distance along the X axis as indicated by the arrow under the control of the electronic controller 106.

In FIG. 13c, the (in this example) transportation mechanism 110 is moved the required distance along the Y axis as indicated by the arrow under the control of the electronic controller 106.

And finally in FIG. 13d, the (in this example) transportation mechanism 110 is moved the required distance along the Z axis as indicated by the arrow under the control of the electronic controller 106 to align the inlet 230 of the mould 201 to be sufficiently close to the outlet 1302 of the filler mechanism 1301.

FIGS. 14a-14c schematically illustrate a vision or image based system for positioning a build platform and an element for introducing building material into a one-piece additively manufactured mould relative to each other.

FIGS. 14a-14c correspond to the system and function of FIGS. 13a-13d except that now a vision based system comprising two cameras or image sensors 1303 are used to move the transportation mechanism 110 and/or the filler mechanism 1301 so the outlet 1302 of the filler mechanism 1301 is in sufficiently vicinity of the inlet 230 of the mould 201, which is illustrated in FIGS. 14a-14c.

Some preferred embodiments have been shown in the foregoing, but it should be stressed that the invention is not limited to these, but may be embodied in other ways within the subject matter defined in the following claims.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. An additive manufacturing device for manufacturing a mould, wherein the additive manufacturing device comprises
    a container for providing at least one mould material,
    a build platform having a build surface to hold and/or support at least one mould being or having been manufactured by an additive manufacturing process,
    a source for providing energy to selectively activate the at least one mould material in or from the container to enable additive manufacturing of the mould, and
    an electronic controller adapted to selectively control the source to manufacture the mould as a one-piece sacrificial mould according to a predetermined design producing a one-piece sacrificial additively manufactured mould comprising
        one or more outer shells circumscribing and enclosing a first inner volume,
        at least one inlet being connected to the first inner volume and being adapted to receive at least one building material,
        at least one outlet being connected to the first inner volume and being adapted to release air from the first inner volume when the first inner volume receives the at least one building material via the at least one inlet, and
    one or more securing elements extending away from and/or into the build platform and configured to be mechanically connected with and released from a transportation mechanism to move the build platform into and/or out from the additive manufacturing device by the transportation mechanism that is external to the build platform, the build platform and/or the one or more securing elements further comprising a number of guiding elements and/or a number of guiding cavities facilitating proper placement of the build platform in the external transportation mechanism, and wherein the at least one mould material is composed of one or more predetermined dissolvable materials whereby a one-piece sacrificial additively manufactured mould manufactured from the at least one mould material is dissolved.

2. The additive manufacturing device according to claim 1, wherein the one-piece sacrificial additively manufactured mould is an injection moulding mould for moulding an object using injection moulding.

3. The additive manufacturing device according to claim 1, wherein the at least one mould material consists of one or more predetermined dissolvable materials whereby a one-piece sacrificial additively manufactured mould manufactured from the at least one mould material is dissolved when being exposed to a predetermined dissolving agent before or during a debinding and/or sintering process.

4. The additive manufacturing device according to claim 1, wherein the external transportation mechanism is configured to automatically load
the build platform into the additive manufacturing device prior to, and in preparation of, commencement of additive manufacturing, and/or
the one-piece sacrificial additively manufactured mould or the build platform comprising the one-piece sacrificial additively manufactured mould into and/or out of the additive manufacturing device.

5. The additive manufacturing device according to claim 1, wherein the transportation mechanism is external to the additive manufacturing device.

6. A moulding system for moulding an object using a one-piece sacrificial additively manufactured mould manufactured by an additive manufacturing device according to claim 1, wherein the moulding system
comprises or is coupled to at least one moulding reservoir or container comprising a building material,
is adapted to introduce building material directly or indirectly from the at least one moulding reservoir or container into the one-piece sacrificial additively manufactured mould, and
is adapted to actively or passively solidify the introduced building material thereby producing an object as defined by the one-piece sacrificial additively manufactured mould, and
wherein the one-piece sacrificial additively manufactured mould is
an injection mould and the moulding system is or comprises an injection moulding device, and wherein the building material comprises one or more of
one or more silicone or other rubbers, and/or
one or more thermoplastic elastomers, and/or
one or more thermosetting compounds, and/or
one or more polyacetal binders, and/or
one or more organic binders, and/or
one or more filler materials such as ceramic powder or particles, metallic powder or particles, glass powder or particles, glass beads, or glass fibres, carbon black or carbon powder or particles, nanotubes, and/or re-used or re-cycled plastic and/or resin powder.

7. The moulding system according to claim 6, wherein the moulding system comprises one or more actuators and one or more controller systems and/or one or more mechanical orientation elements that are configured to position the build platform and/or an element for introducing the building material into the one-piece sacrificial additively manufactured mould relative to each other to permit the introduction of the building material into the one-piece sacrificial additively manufactured mould.

8. A post-processing moulding system, wherein the post-processing moulding system is adapted to receive a one-piece sacrificial additively manufactured mould manufactured by an additive manufacturing device according to claim 1,
the system comprising a moulded object moulded by a moulding system that
comprises or is coupled to at least one moulding reservoir or container comprising at least one building material,
is adapted to introduce building material directly or indirectly from the at least one moulding reservoir or container into the one-piece sacrificial additively manufactured mould, and
is adapted to actively or passively solidify the introduced building material thereby producing an object as defined by the one-piece sacrificial additively manufactured mould, and
wherein the one-piece sacrificial additively manufactured mould is
an injection mould and the moulding system is or comprises an injection moulding device, and wherein the building material comprises one or more of
one or more silicone or other rubbers, and/or
one or more thermoplastic elastomers, and/or
one or more thermosetting compounds, and/or
one or more polyacetal binders, and/or
one or more organic binders, and/or
one or more filler materials including ceramic powder or particles, metallic powder or particles, glass powder or particles, glass beads, or glass fibres, carbon black or carbon powder or particles, nanotubes, and/or re-used or re-cycled plastic and/or resin powder;
or wherein the system is adapted to promote or control a post-curing and/or setting of the moulded object, and wherein the post-processing moulding system further comprises a release element adapted to release the moulded object from the one-piece sacrificial additively manufactured mould.

9. The post-processing moulding system according to claim 8, wherein the one-piece sacrificial additively manufactured mould consists of dissolvable material and the release element is adapted to
apply a dissolving agent to the one-piece sacrificial additively manufactured mould to enable the release of the moulded object from the one-piece sacrificial additively manufactured mould.

10. The post-processing moulding system according to claim 8, wherein the release element is adapted to
apply a temperature within a predetermined range or above a predetermined temperature threshold to the one-piece sacrificial additively manufactured mould to promote the release of the moulded object from the one-piece sacrificial additively manufactured mould, and/or
apply a temperature within a predetermined range or below a predetermined temperature threshold to the one-piece sacrificial additively manufactured mould thereby enabling the release of the moulded object from the one-piece sacrificial additively manufactured mould.

11. A manufacturing system for manufacturing an object using a mould, the manufacturing system comprising:
an additive manufacturing device according to claim 1;
the manufacturing system comprising a moulding system, wherein the moulding system
- comprises or is coupled to at least one moulding reservoir or container comprising at least one building material,
- is adapted to introduce building material directly or indirectly from the at least one moulding reservoir or container into the one-piece sacrificial additively manufactured mould, and
- is adapted to actively or passively solidify the introduced building material thereby producing an object as defined by the one-piece sacrificial additively manufactured mould, and wherein the one-piece sacrificial additively manufactured mould is
- an injection mould and the moulding system is or comprises an injection moulding device, and wherein the building material comprises one or more of
  - one or more silicone or other rubbers, and/or
  - one or more thermoplastic elastomers, and/or
  - one or more thermosetting compounds, and/or
  - one or more polyacetal binders, and/or
  - one or more organic binders, and/or
  - one or more filler materials including ceramic powder or particles, metallic powder or particles, glass powder or particles, glass beads, or glass fibres, carbon black or carbon powder or particles, nanotubes, and/or re-used or re-cycled plastic and/or resin powder;
- or the manufacturing system comprising a post-processing moulding system according to claim 8.

12. A method of manufacturing a mould using an additive manufacturing device according to claim 1, wherein method comprises
- controlling energy to of source to selectively activate, and if required subsequently solidify, the at least one mould material to additively manufacture the mould on a build platform as a one-piece sacrificial additively manufactured mould according to a predetermined design; and wherein the manufactured one-piece sacrificial additively manufactured mould comprises
- one or more outer shells circumscribing and enclosing at least a first inner volume,
- at least one inlet being connected to the first inner volume and being adapted to receive at least one building material,
- at least one outlet being connected to the first inner volume and being adapted to release air from the first inner volume when the first inner volume receives the at least one building material via the at least one inlet.

13. The method according to claim 12, wherein the method further comprises moulding an object using the one-piece sacrificial additively manufactured mould and at least one building material by introducing the building material directly or indirectly from at least one moulding reservoir or container into the one-piece sacrificial additively manufactured mould thereby producing an object as defined by the one-piece sacrificial additively manufactured mould.

14. The method according to claim 12, wherein the method comprises
- producing at least one one-piece sacrificial additively manufactured mould on the build platform with the additive manufacturing system,
- subsequently moving the build platform and/or the at least one one-piece sacrificial additively manufactured mould to a moulding system,
- subsequently producing at least one object at the moulding system using the at least one one-piece sacrificial additively manufactured mould.

15. The method according to claim 14, wherein the method further comprises the step of automatically moving a build platform into the additive manufacturing system by the external transportation mechanism and/or another transport mechanism before producing the at least one one-piece sacrificial additively manufactured mould on the build platform with the additive manufacturing system.

16. The method according to claim 14, wherein the moulding system is an injection moulding system and wherein one one-piece sacrificial additively manufactured mould has been manufactured with a shape where at least a part of it matingly fits in the injection moulding system at a moulding location.

17. The method according to claim 14, wherein at least one produced object is automatically moved by the external transportation mechanism together with the at least one-piece sacrificial additively manufactured mould, to a post-processing system.

* * * * *